(12) United States Patent
Hokkyo et al.

(10) Patent No.: US 6,270,885 B1
(45) Date of Patent: Aug. 7, 2001

(54) PERPENDICULAR MAGNETIC RECORDING MEDIUM

(75) Inventors: Hirotaka Hokkyo; Shinzo Tsuboi; Katsumichi Tagami, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/193,730

(22) Filed: Nov. 17, 1998

(30) Foreign Application Priority Data

Nov. 17, 1997 (JP) .................................................... 9-315654

(51) Int. Cl.$^7$ ....................................................... G11B 5/66
(52) U.S. Cl. .................. 428/332; 428/336; 428/694 TM; 428/694 TR; 428/900; 360/113; 360/135
(58) Field of Search ..................... 428/694 TM, 694 TR, 428/332, 900, 336; 360/113, 135

(56) References Cited

U.S. PATENT DOCUMENTS 5,589,262 * 12/1996 Kiuchi .................................. 428/336

FOREIGN PATENT DOCUMENTS

| 57-036435 | 2/1982 | (JP) . |
| 63-56812 * | 3/1988 | (JP) . |
| 3-224122 | 10/1991 | (JP) . |
| 5-250651 | 9/1993 | (JP) . |
| 5-266455 | 10/1993 | (JP) . |
| 6-103553 | 4/1994 | (JP) . |
| 6-180834 | 6/1994 | (JP) . |

OTHER PUBLICATIONS

Ouchi, K. & Shun–ichi, I., "Recording Performances and Preparation of Double Layer Medium for Perpendicular Magnetic Recording," Journal of the Institute of Applied Magnetics Engineers of Japan, vol. 8, No. 1, pp. 17–22, (1984).

* cited by examiner

Primary Examiner—Leszek Kiliman
(74) Attorney, Agent, or Firm—Foley & Lardner

(57) ABSTRACT

In a perpendicular magnetic recording medium, a soft magnetic film playing the role of an back layer, but not having a domain wall structure, is positioned beneath a perpendicular magnetization film. Such a back layer improves the envelope characteristic of the medium at the time of recording and reproduction. Moreover, the medium is free from spike noise and the decrease or cancellation of recorded magnetization ascribable to the movement of the domain wall of a back layer. The medium of the present invention is therefore a drastic solution to the problems particular to a conventional perpendicular magnetic recording medium and realizes desirable recording and reproducing characteristics.

17 Claims, 19 Drawing Sheets

Fig. 32

| $Co_{65}Cr_{35}$ [nm] | 0 | 0 | 20 | 50 | 100 | 120 |
|---|---|---|---|---|---|---|
| Ra [nm] | 5.1 | 0.52 | 0.49 | 0.60 | 0.55 | 4.5 |

Fig. 33

| $Co_{65}Cr_{35}$ [nm] | 0 | 10 | 20 | 50 | 100 | 120 |
|---|---|---|---|---|---|---|
| $\Delta\theta 50$ [°] OF $Co_{78}Cr_{19}Ta_3$ | 8.7 | 1.5 | 1.9 | 2.1 | 1.5 | 5.6 |

Fig. 34

| $Co_{65}Cr_{35}$ [nm] | 0 | 0 | 20 | 50 | 100 | 120 |
|---|---|---|---|---|---|---|
| SQUARE RATIO | 0.61 | 0.96 | 0.96 | 0.99 | 0.98 | 0.65 |

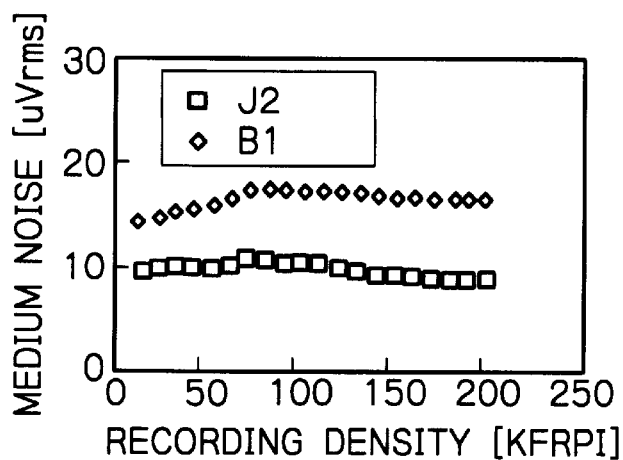
Fig. 35
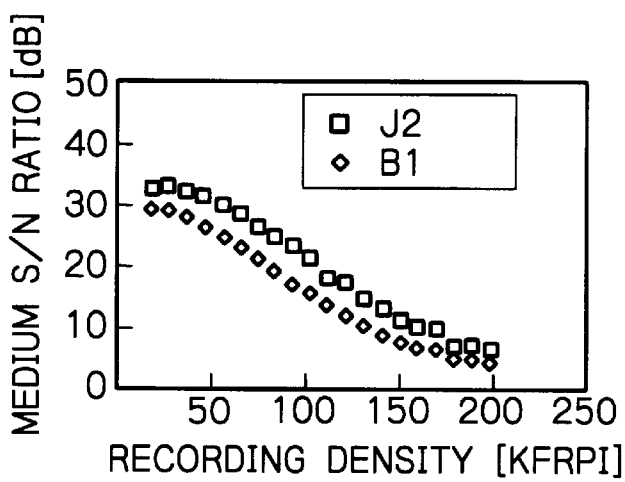
Fig. 36
Fig. 37
| Ti [nm] | 0 | 10 | 20 | 50 | 100 | 120 |
|---|---|---|---|---|---|---|
| Ra [nm] | 6.5 | 0.55 | 0.48 | 0.56 | 0.52 | 5.3 |

| Ti [nm] [nm] | 0 | 10 | 20 | 50 | 100 | 120 |
|---|---|---|---|---|---|---|
| $\Delta\theta_{50}[°]$ OF $Co_{78}Cr_{19}Ta_3$ | 10.2 | 2.2 | 2.2 | 1.6 | 2.1 | 8.8 |

| Ti [nm] | 0 | 10 | 20 | 50 | 100 | 120 |
|---|---|---|---|---|---|---|
| SQUARE RATIO | 0.65 | 0.95 | 0.95 | 0.96 | 0.95 | 0.67 |

| $Cr_{20}Ti_{80}$ [nm] | 0 | 10 | 20 | 50 | 100 | 120 |
|---|---|---|---|---|---|---|
| Ra [nm] | 4.9 | 0.52 | 0.47 | 0.56 | 0.52 | 3.9 |

| $Cr_{20}Ti_{80}$ [nm] | 0 | 10 | 20 | 50 | 100 | 120 |
|---|---|---|---|---|---|---|
| $\Delta\theta 50$ [°] OF $Co_{16}Cr_{19}Ta_3$ | 8.5 | 1.2 | 1.8 | 1.7 | 1.5 | 6.8 |

Fig. 44
| $Cr_{20}Ti_{80}$ [nm] | 0 | 10 | 20 | 50 | 100 | 120 |
|---|---|---|---|---|---|---|
| SQUARE RATIO | 0.59 | 0.97 | 0.95 | 0.95 | 0.95 | 0.62 |
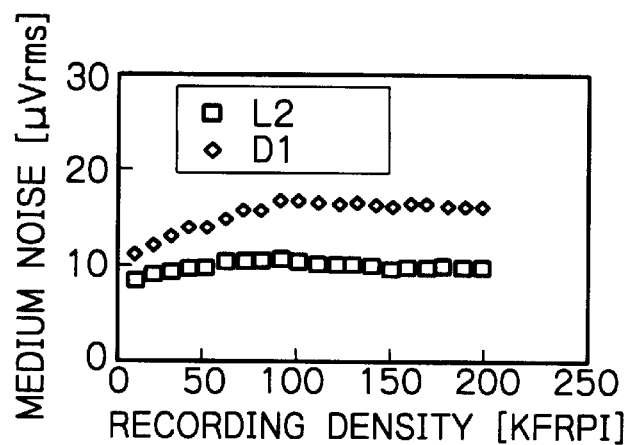
Fig. 45
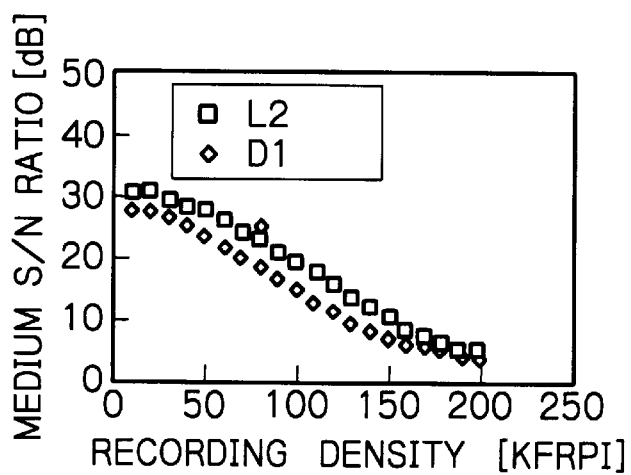
Fig. 46

| Cr [nm] | 0 | 100 | 200 | 300 | 400 | 500 |
|---|---|---|---|---|---|---|
| Hc [Oe] | 0.1 | 200 | 280 | 350 | 410 | 600 |

| S/N RATIO [dB] OF MEDIUM E1 AT 400 KFRPI | 29.7 |
|---|---|
| S/N RATIO [dB] OF MEDIUM M2 AT 400 KFRPI | 32.2 |

| V [nm] | 0 | 100 | 200 | 300 | 400 | 500 |
|---|---|---|---|---|---|---|
| He [Oe] | 0.1 | 220 | 310 | 360 | 420 | 610 |

| S/N RATIO [dB] OF MEDIUM F1 AT 400 KFRPI | 29.6 |
|---|---|
| S/N RATIO [dB] OF MEDIUM N2 AT 400 KFRPI | 31.9 |

| Cu [nm] | 0 | 100 | 200 | 300 | 400 | 500 |
|---|---|---|---|---|---|---|
| Hc [Oe] | 0.1 | 190 | 310 | 340 | 450 | 600 |

| S/N RATIO [dB] OF MEDIUM G1 AT 400 KFRPI | 29.5 |
|---|---|
| S/N RATIO [dB] OF MEDIUM P2 AT 400 KFRPI | 31.9 |

PERPENDICULAR MAGNETIC RECORDING MEDIUM

BACKGROUND OF THE INVENTION

The present invention relates to a perpendicular magnetic recording medium usable as, e.g., a magnetic disk and, more particularly, to a perpendicular magnetic recording medium having desirable recording and reproducing characteristics.

In parallel with the advance of personal computers and work stations, hard disk drives are increasing in capacity and decreasing in size and needs magnetic disks capable of recording data in higher planar density. However, high planar recording density is not achievable with the predominant longitudinal recording system without bringing about the thermal jitter of recorded magnetization ascribable to a decrease in the size of bits. In addition, a coercive force almost exceeding the recording ability of a record head is required. Today, a perpendicular magnetic recording system is in study as an implementation for noticeably increasing planar recording density. For the perpendicular magnetic recording system, a double layer, perpendicular magnetic recording medium has been proposed and is made up of a soft magnetic film having high permeability and a perpendicular magnetization film having high perpendicular anisotropy.

Specifically, a conventional perpendicular recording medium has a soft magnetic film or back layer and a perpendicular magnetization film sequentially formed on a substrate in this order, as taught in the Journal of the Institute of Applied Magnetics Engineers of Japan, Vol. 8, NO. 1, 1984, p. 17. The soft magnetic film and magnetization film may be respectively formed of an NiFe alloy and a CoCr alloy.

However, a problem with the above conventional medium is that the soft magnetic layer or back layer has a domain wall (magnetic domain) structure, e.g., either a Bloch domain wall or a Neil domain wall. The domain wall produces spike noise at the time of recording and reproduction of data from the medium. Spike noise degrades the envelope characteristic of the medium and thereby obstructs faithful reproduction. This kind of noise occurs when a head moves above the domain wall of the soft magnetic film.

Another problem is that the recorded magnetization of the medium is unstable due to external stray magnetic fields. Specifically, the domain wall of the soft magnetic film easily moves due to external stray magnetic fields. If the movement of the domain wall occurs in the region of the soft magnetic film corresponding to the main pole of a perpendicular magnetic head, then the magnetization recorded in the perpendicular magnetization film playing the role of a perpendicular recording layer decreases or practically disappears.

The stray magnetic fields are formed by motors located in the vicinity of a magnetic disk disposed in a magnetic disk drive, e.g., a motor for causing the disk to spin and a motor for positioning the head. Although such magnetic fields are extremely weak, they cause the domain wall of the soft magnetic film to move when concentrating on the tip of the main pole of the head, reducing or even canceling the recorded magnetization. This is a critical defect when it comes to a data storing apparatus.

Technologies relating to the present invention are also disclosed in, e.g., Japanese Patent Laid-Open Publication Nos. 3-224122, 5-250651, 5-266455, 6-103553, and 6-180834.

SUMMARY OF THE INVENTION

It is therefore an object of the present invention to provide a new and useful perpendicular magnetic recording medium exhibiting a desirable envelope characteristic at the time of recording and reproduction and free from spike noise and the decrease or cancellation of recorded magnetization ascribable to the movement of the domain wall of a soft magnetic layer or back layer.

A perpendicular magnetic recording medium of the present invention includes a substrate, a soft magnetic film formed on the substrate, and a perpendicular magnetization film formed on the soft magnetic film. The soft magnetic film does not have a domain wall structure and has a coercive force of less than 300 Oe inclusive.

BRIEF DESCRIPTION OF THE DRAWINGS

The above and other objects, features and advantages of the present invention will become more apparent from the following detailed description taken with the accompanying drawings in which:

FIG. 32 is a table showing a relation between the thickness and the surface smoothness of an intermediate layer included in a tenth embodiment of the present invention;

FIG. 33 is a table showing a relation between the thickness of the intermediate layer and the perpendicular orientation of a CoCrTa film particular to the tenth embodiment;

FIG. 34 is a table showing a relation between the thickness of the intermediate layer and the square ratio of the CoCrTa film particular to the tenth embodiment;

FIG. 35 is a graph showing the dependency of medium noise on recording density particular to the tenth embodiment;

FIG. 36 is a graph showing the dependency of a medium S/N (Signal-to-Noise) ratio on recording density particular to the tenth embodiment;

FIG. 37 is a table showing a relation between the thickness and the surface smoothness of an intermediate layer included in an eleventh embodiment of the present invention;

FIG. 44 is a table showing a relation between the thickness of the intermediate layer and the square ratio of the CoCrTa film particular to the twelfth embodiment;

FIG. 45 is a graph showing the dependency of medium noise on recording density particular to the twelfth embodiment;

FIG. 46 is a graph showing the dependency of an S/N ratio on recording density particular to the twelfth embodiment;

DESCRIPTION OF THE PREFERRED EMBODIMENTS

Figure 1:
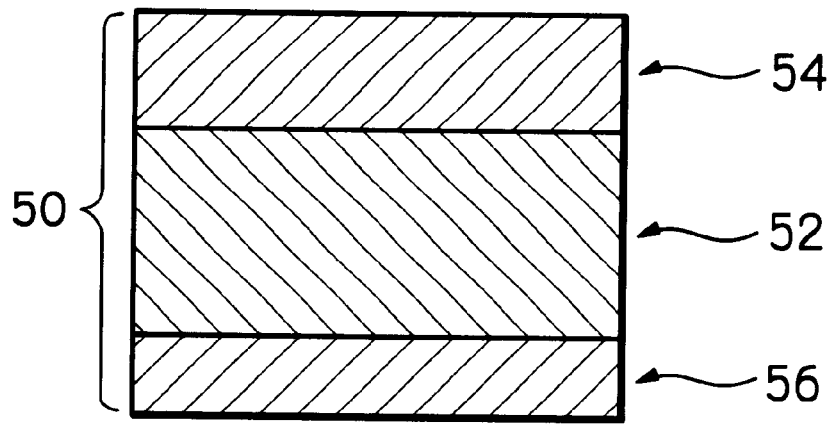
FIG. 1 is a section showing a conventional perpendicular magnetic recording medium.

To better understand the present invention, brief reference will be made to a conventional perpendicular double layer, magnetic recording medium. As shown, the recording medium, generally 50, has a soft magnetic film or back layer 52 and a perpendicular magnetization film 54 sequentially formed on a substrate 50 in this order. The soft magnetic layer 52 and magnetization layer 54 may be respectively formed of an NiFe ally and a CoCr alloy, as mentioned earlier. The recording medium 50, however, has some problems left unsolved, as discussed previously.

Figure 2:
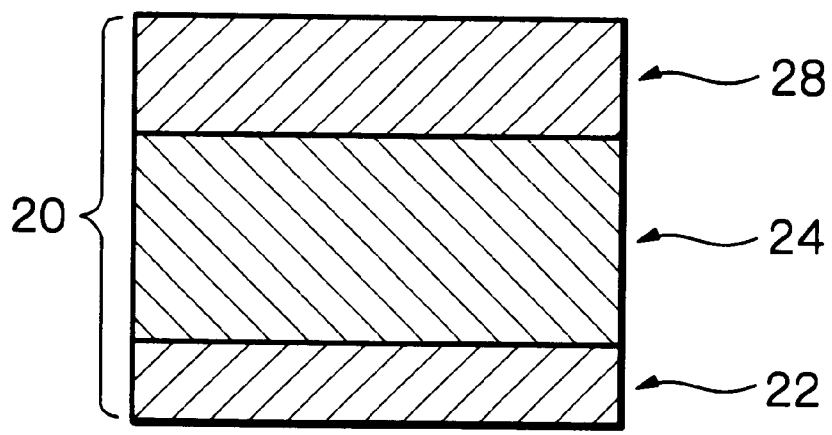
FIG. 2 is a section showing the basic configuration of a perpendicular magnetic recording medium in accordance with the present invention.

Before entering into the detailed description of preferred embodiments of the present invention, reference will be made to FIG. 2 for describing the basic configuration of a perpendicular magnetic recording medium in accordance with the present invention. As shown, the recording medium, generally 20, includes a substrate 22. A soft magnetic film or back layer 24 is formed on the substrate, but does not have the conventional domain wall structure. A perpendicular magnetization film 28 is formed on the soft magnetic film 24. To form the soft magnetic film 24 not having a domain wall structure, use may be made of an FeSiAl film, an FeSiAl alloy film, an FeTaN film or an FeTaN alloy film. Alternatively, use may be made of a granular thin film implemented by either one of the rows and columns of a matrix which are respectively constituted by a parent material and granules dispersed in the parent material. The parent material and granules may be implemented by $SiO_2$ or C and Co, CoPt or CoCrPt, respectively.

The recording medium 20 with the above configuration is a drastic solution to the problems ascribable to the conventional soft magnetic layer having a domain wall structure.

FIRST EMBODIMENT

Figure 3:
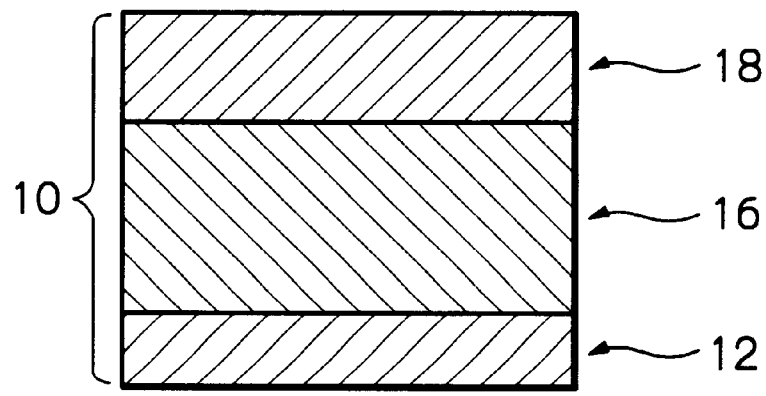
FIG. 3 is a section showing a first embodiment of the medium in accordance with the present invention.

Referring to FIG. 3, a first embodiment of the perpendicular magnetic recording medium in accordance with the present invention is shown and generally designated by the reference numeral 10. As shown, the recording medium 10 includes a 2.5 inch thick substrate 12. A 500 nm thick soft magnetic film or back layer 16 is formed on the substrate 12 and formed of FeSiAl. A perpendicular magnetization film 18 is formed on the soft magnetic film 16 and formed of $Co_{78}Cr_{19}Ta_3$ (at %). The recording medium 10 additionally includes a C protection layer not shown.

A procedure for producing the above recording medium 10 is as follows. First, by using a 6 inch thick FeSiAl target, the soft magnetic film 16 in the form of a 500 nm thick FeSiAl film was formed on the 2.5 inch substrate 12 by sputtering under the following conditions:

Initial chamber vacuum: below 5×10−7 mTorr

Substrate Temperature: 600° C.

Power: 0.5 kW

Argon gas pressure: 4 mTorr

Film forming rate: 3 nm/sec

Subsequently, by using a $Co_{78}Cr_{19}Ta_3$ (at %) target, the perpendicular magnetization film 18 in the form of a 100 nm thick $Co_{78}Cr_{19}Ta_3$ film was formed on the soft magnetic film 16 at a substrate temperature of 200° C. A 10 nm thick C protection layer was formed on the perpendicular magnetization film 18. This medium will be referred to as a medium A2 hereinafter. An FeSiAl film was also formed at a substrate temperature held at room temperature for the comparison of coercive forces.

A conventional medium A1 was formed by substituting an NiFe film for the FeSiAl film or soft magnetic film and forming a $Co_{78}Cr_{19}Ta_3$ (at %) film in the same manner as with the medium A2.

To estimate the performance of the medium A2, tests for observing a domain wall, measuring a coercive force, measuring recording and reproducing characteristics and so forth were conducted, as will be described hereinafter. The same estimation was also applied to alternative embodiments to follow.

The domain wall structure of the FeSiAl film 16 included in the medium 2A was observed by using a powder pattern method. First, fine scratches were formed on the surface of the FeSiAl film formed at the substrate temperature of 600° C. in order to make the domain wall structure easy to see. Then, a bitter liquid (magnetic colloid) was applied to the scratched surface of the FeSiAl film. This sample was set on an electromagnet for the observation of a domain wall, but a clear domain wall structure was not observed. Even when a magnetic field was applied to the sample little by little, no change was observed. This was also true with the FeSiAl film formed at a substrate temperature held at room temperature.

When the NiFe film of the conventional medium A1 was observed under the same conditions as the medium A2, a clear domain wall was found. The domain wall was found to move when a magnetic field was applied to the medium A1 little by little.

The above comparison shows that the magnetization of the NiFe film is derived from the movement of a domain wall, but the magnetization of the FeSiAl film is not derived from it.

The coercive force of the FeSiAl film and that of the NiFe were measured by use of a sample vibration type magnetometer (VSM). The FeSiAl film and NiFe film formed at 600° C. both had a coercive force of 0.1 Oe while the FeSiAl film formed at room temperature had a coercive force of 300 Oe.

The media A2 and A1 were subjected to the estimation of recording and reproduction using a single pole head and a composite ID/MR head. The ID/MR head had a recording track width of 4 μm, a reproduction track width of 3 μm, a recording gap length of 0.4 μm, and a reproduction gap length of 0.32 μm. The single pole head had a track width of 10 μm and a main pole thickness of 0.4 μm. The estimation was effected with a record current of 10 mAop, a sense current of 12 mA, a peripheral speed of 12.7 m/sec, a flight of 45 nm, and a noise band of 45 MHz. Experiments were conducted with a case wherein a signal recorded by the single pole head was read out by the MR head and a case wherein a signal recorded by the IC head was read out by the MR head.

Figure 4:
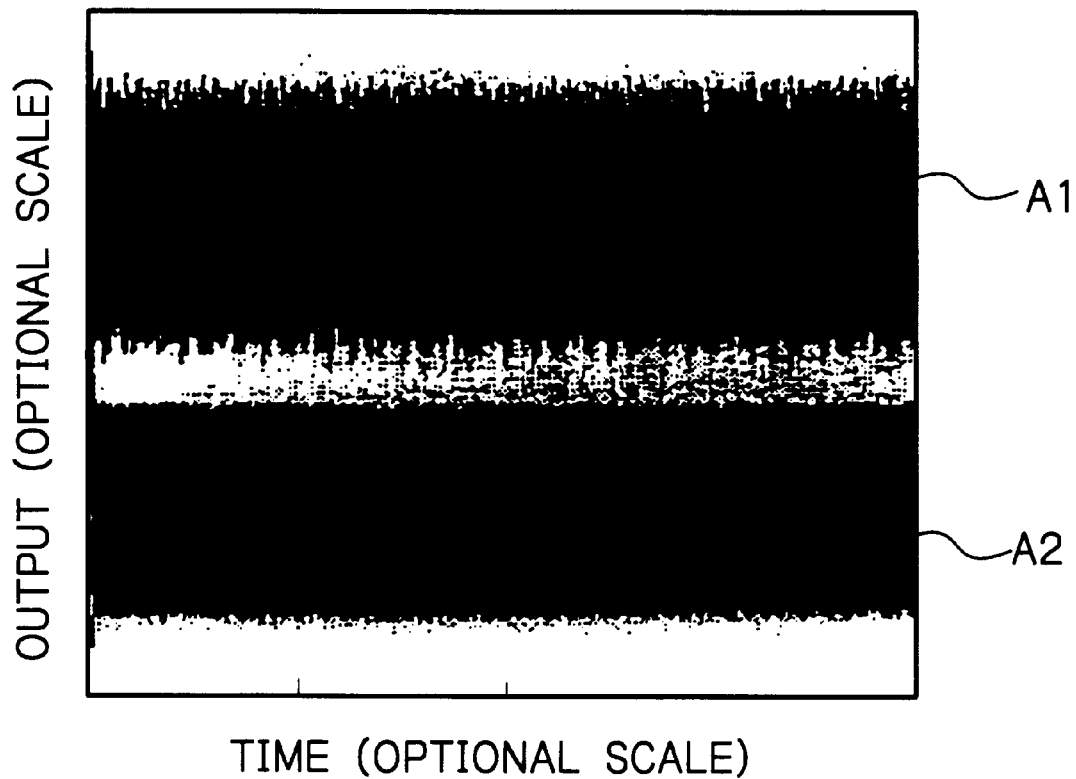
FIG. 4 is a graph showing an envelope characteristic achievable with the first embodiment.

FIG. 4 shows the envelope characteristic of the medium A2 and that of the medium A1. As shown, the envelope of the medium A2 is far sharper than the envelope of the medium A1, i.e., it has a noticeably improved envelope characteristic. While FIG. 4 shows the results of tests in which signals recorded by the single pole head were read out by the MR head, the same results were achieved even when signals recorded by the ID head were read out by the MR head.

The experimental results of FIG. 4 show that the NiFe film of the medium A1 having a domain wall structure suffers from spike noise ascribable to the movement of a domain wall, but the FeSiAl film of the medium A2 is practically free from spike noise because of the absence of a domain wall. Even a medium with an back layer implemented by an FeSiAl film formed at room temperature achieves the same result because a magnetic body originally obstructs the formation of a domain wall if it has an intense coercive force. Specifically, the FeSiAl film formed at room temperature has a far greater coercive force than the FeSiAl film formed at 600° C. and obstructs the formation of a domain wall more positively.

Figure 5:
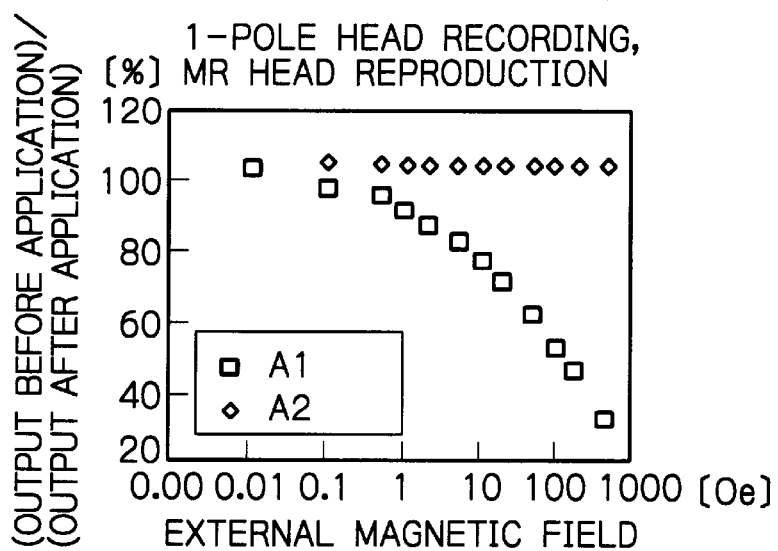
FIG. 5 is a graph showing a relation between external magnetic fields and the ratio of an output after the application of a magnetic field to an output before the application of the same and particular to the first embodiment.

The stability of recorded magnetization against external stray magnetic fields was estimated with the media A2 and A1. For the estimation, a single pole head recorded signals in the medium A2 and A1. Then, DC magnetic fields between 0.1 Oe and 500 Oe were applied to the medium A2 and A1 by a Helmholtz coil so as to compare reproduced outputs before and after the application of the magnetic fields. FIG. 5 plots the results of the comparison, i.e., the ratios of the reproduction outputs after the application to the reproduction outputs before the same in percentage. As FIG. 5 indicates, as for the medium A1, the recorded magnetization and therefore reproduction output begins to decrease when 0.1 Oe corresponding to the coercive force of the soft magnetic film is applied; the magnetization sequentially decreases with an increase in the strength of the magnetic field. By contrast, the magnetization of the medium A2 does not decrease even when subjected to a magnetic field of 500 Oe. The medium A2 is therefore far superior to the medium A1 as to the stability of a recorded signal against external stray magnetic fields.

Figure 6:
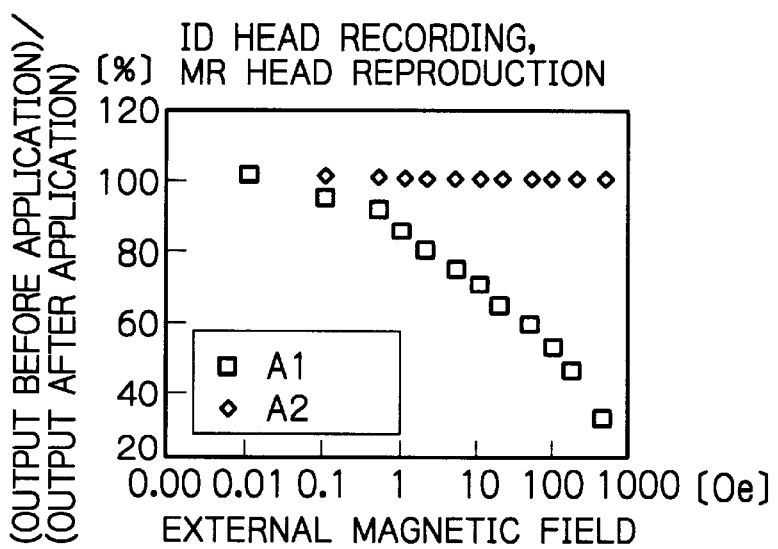
FIG. 6 is a graph showing another relation between the external magnetic fields and the above ratio particular to the first embodiment.

The above tendency was observed in exactly the same manner when signals recorded by an ID head were read out by an MR head, as shown in FIG. 6. In this case, too, the medium with the FeSiAl film formed at room temperature attains stable recorded magnetization against stray electric fields. However, this kind of FeSiAl film introduces distortions in a rectangular reproduced waveform because its coercive force is as great as 300 Oe. To serve as the back layer of a perpendicular double layer medium and to implement a rectangular reproduced waveform, the FeSiAl film should preferably have a coercive force of 100 Oe or below.

Figure 7:
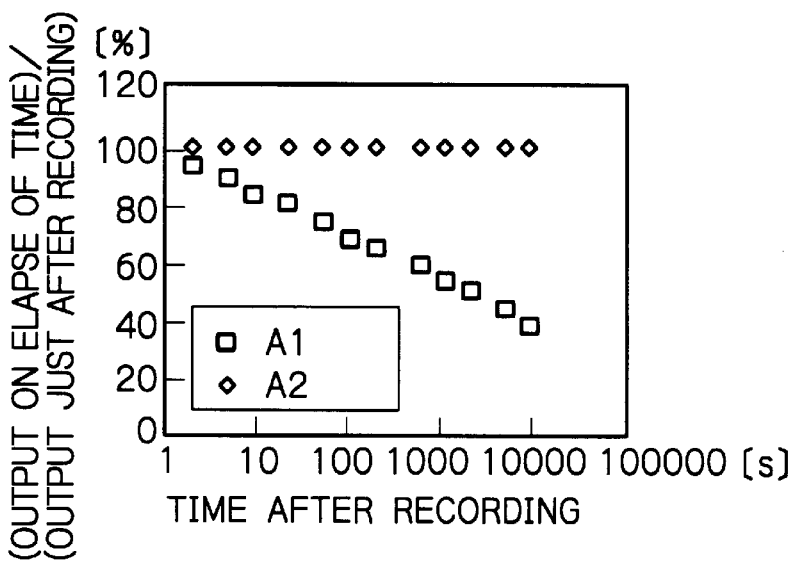
FIG. 7 is a graph showing a relation between a period of time elapsed since the application of external magnetic fields and the ratio of an output reproduced on the elapse of a preselected period of time to an output reproduced before the elapse of the same particular to a second embodiment of the present invention.

To examine the aging of recorded magnetization, signals were recorded in the media A2 and A1 by a single pole head, and then reproduction outputs were measured with the head being loaded on each medium. Assuming that a time t is 1 second, the reproduction outputs just after recording each was measured up to $t=1\times10^4$ seconds. Reproduction outputs at t=1 second and reproduction outputs on the elapse of a preselected period of time were compared, as shown in FIG. 7. FIG. 7 shows the ratios of the reproduction outputs on the elapse of the preselected period of time to the reproduction outputs at t=1 second in percentage.

As FIG. 7 indicates, the reproduction output of the medium A1 decreases substantially in proportional to the logarithm of the period of time after recording while the reproduction output of the medium A2 does not decrease at all. The decrease of reproduction output is presumably ascribable to the movement of the NiFe domain wall easily occurred under the influence of geomagnetism and even weak magnetic fields derived from drive motors, and occurred in a region where the main pole of the perpendicular head is present. By contrast, the FeSiAl film of the medium A2 is free from the decrease of magnetization because it does not have a domain wall structure. This is also true with the aging of recorded magnetization achievable with the medium whose FeSiAl film is formed at room temperature, for the reason described with reference to FIG. 4.

It will thus be seen that the medium A2 achieves an improved envelope characteristic at the time of recording and reproduction and obviates spike noise and the decrease or cancellation of recorded magnetization ascribable to the movement of a soft magnetic film or back layer. The medium A2 therefore easily implements high recording density.

SECOND EMBODIMENT

A perpendicular magnetic recording medium B2 was produced that was identical with the medium A2 except that an FeSiAlRuTi film target was used in order to form an FeSiAlRuTi film on a substrate as a soft magnetic film. For the comparison of coercive forces, another FeSiAlRuTi film was formed at a substrate temperature held at room temperature. The FeSiAlRuTi film of the medium B2 showed no clear domain wall structure and showed no change even when a magnetic field was applied thereto little by little. This was also true with the FeSiAlRuTi film formed at room temperature. This proves that the magnetization of the FeSiAlRuTi film is not derived from the movement of a domain wall.

The coercive force of the medium B2 was measured to be 0.1 Oe. The FeSiAlRuTi film formed at room temperature had a coercive force of 300 Oe. As for the recording and reproducing characteristics, the medium B2, like the medium A2 had a far sharper envelope than the conventional medium A1. Such a difference in envelope characteristic was also indicated by the results of experiments in which signals recorded by an ID head were read out by an MR head.

It will be seen from the above that the FeSiAlRuTi film playing the role of a soft magnetic film or back layer fully solves the spike noise problem because it does not have a domain wall structure. The medium with the FeSiAlRuTi film formed at room temperature also achieves the same advantages for the reason described in relation to the first embodiment.

Figure 8:
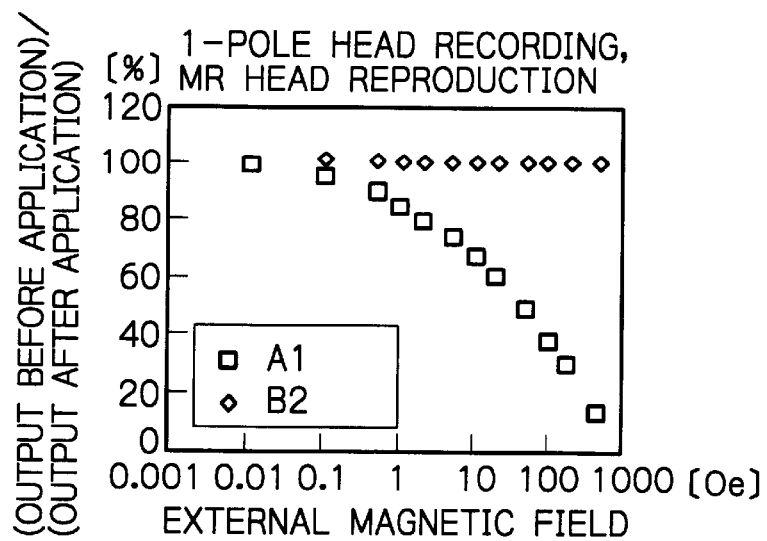
FIG. 8 is a graph showing a relation between external magnetic fields and the ratio of an output after the application of a magnetic field to an output before the application of the same particular to the second embodiment.
Figure 9:
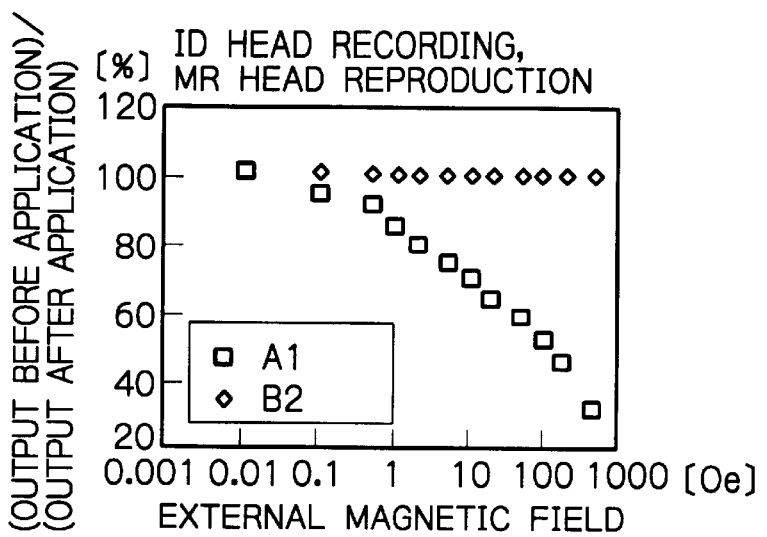
FIG. 9 is a graph showing another relation between the external magnetic fields and the above ratio particular to the second embodiment.

FIG. 8 is a graph similar to FIG. 5, showing the stability of recorded magnetization achievable with the medium B2 against stray magnetic fields. As shown, the magnetization of the medium B2 does not decrease even when subjected to a magnetic field of 500 Oe. The medium B2 is therefore far superior to the medium A1 as to the stability of a recorded signal against external stray magnetic fields. This tendency was observed in exactly the same manner when signals recorded by an ID head were read out by an MR head, as shown in FIG. 9.

Figure 10:
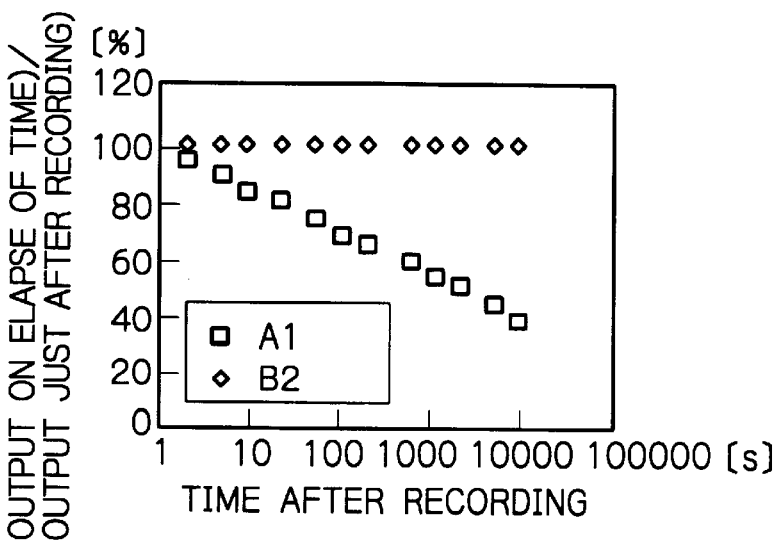
FIG. 10 is a graph showing another relation between the period of time and the ratio of an output reproduced on the elapse of a preselected period of time to an output reproduced before the elapse of the same particular to the second embodiment.

FIG. 10 compares the media 82 and A1 with respect to the aging of recorded magnetization, i.e., the ratio of the reproduction output on the elapse of the preselected period of time to the reproduction output at t=1 second. As shown, the reproduction output of the medium B2 does not fall at all while the reproduction output of the medium A1 falls. The FeSiAl film of the medium B2 is free from the decrease of magnetization because it does not have a domain wall structure. This is also true with the aging of recorded magnetization achievable with the medium whose FeSiAl-RuTi film is formed at room temperature, for the reason described in relation to the first embodiment.

It will thus be seen that the medium B2 achieves an improved envelope characteristic at the time of recording and reproduction and obviates spike noise and the decrease or cancellation of recorded magnetization ascribable to the movement of a soft magnetic film or back layer. The medium B2 therefore easily implements high recording density.

THIRD EMBODIMENT

A perpendicular magnetic recording medium Q2 was produced that was identical with the medium A2 except that an FeTaN film target was used in order to form an FeTaN film on a substrate as a soft magnetic film. For the comparison of coercive forces, another FeTaN film was formed at a substrate temperature held at room temperature. The FeTaN film of the medium Q2 showed no clear domain wall structure and showed no change even when a magnetic field was applied thereto little by little. This was also true with the FeTaN film formed at room temperature. This proves that the magnetization of the FeTaN film is not derived from the movement of a domain wall.

The coercive force of the medium Q2 was measured to be 0.1 Oe. The FeTaN film formed at room temperature had a coercive force of 300 Oe. As for the recording and reproducing characteristics, the medium Q2, like the medium A2 had a far sharper envelope than the conventional medium A1. Such a difference in envelope characteristic was also indicated by the results of experiments in which signals recorded by an ID head were read out by an MR head.

It will be seen from the above that the FeTaN film playing the role of a soft magnetic film or back layer fully solves the spike noise problem because it does not have a domain wall structure. The medium with the FeTaN film formed at room temperature also achieves the same advantages for the reason described in relation to the first embodiment.

Figure 11:
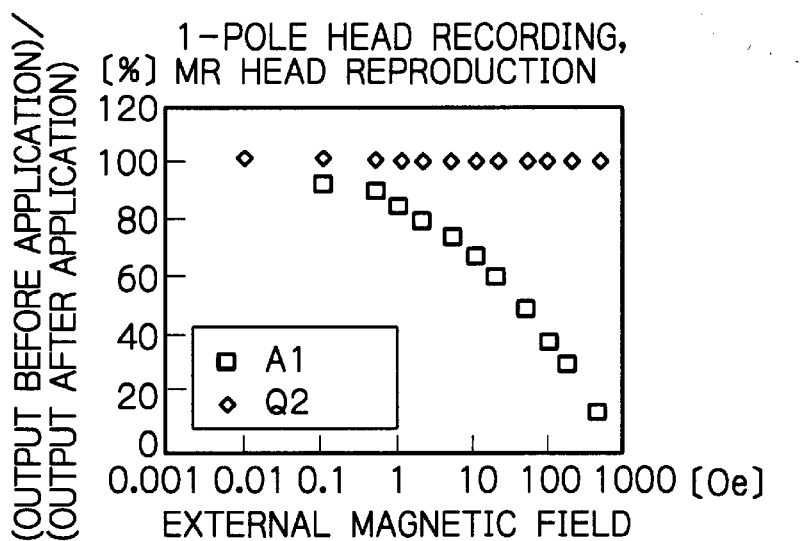
FIG. 11 is a graph showing a relation between external magnetic fields and the ratio of an output after the application of a magnetic field to an output before the application of the same particular to a third embodiment of the present invention.
Figure 12:
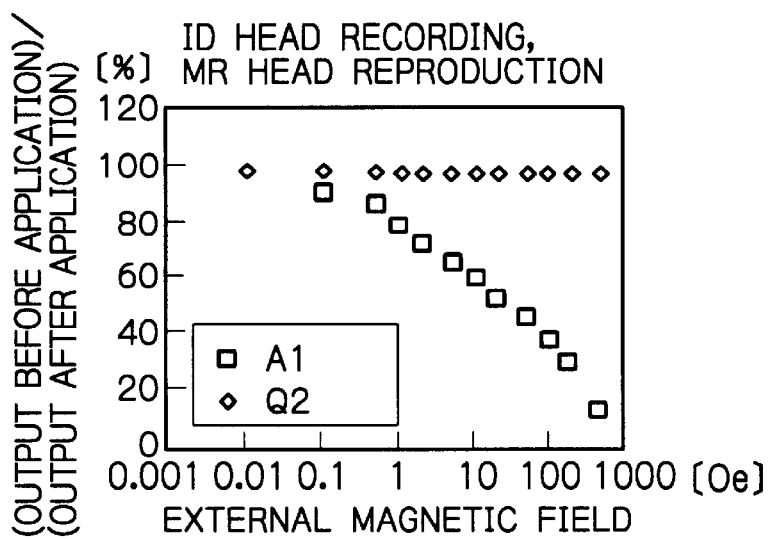
FIG. 12 a graph showing another relation between the external magnetic fields and the above ratio particular to the third embodiment.

FIG. 11 is a graph similar to FIG. 5, showing the stability of recorded magnetization achievable with the medium Q2 against stray magnetic fields. As shown, the magnetization of the medium Q2 does not decrease even when subjected to a magnetic field of 500 Oe. The medium Q2 is therefore far superior to the medium A1 as to the stability of a recorded signal against external stray magnetic fields. This tendency was observed in exactly the same manner when signals, recorded by an ID head were read out by an MR head, as shown in FIG. 9. The above stability of recorded magnetization was also attained with the medium with the FeTaN film formed at room temperature.

Figure 13:
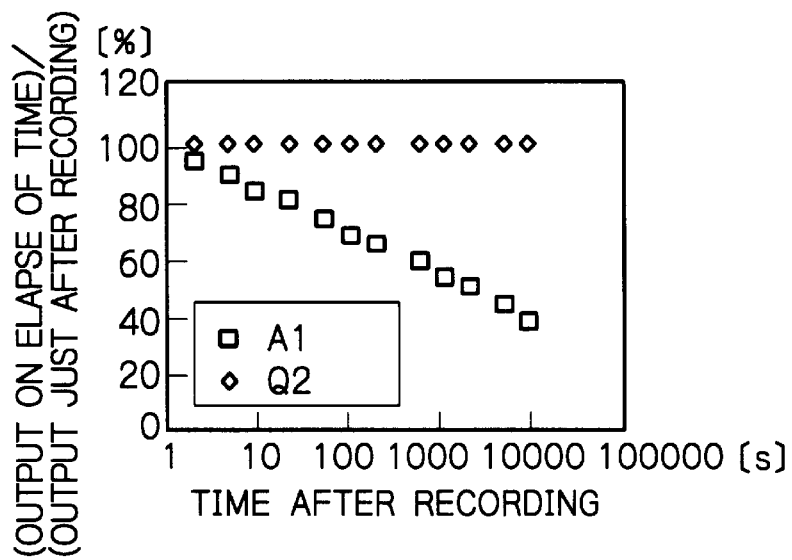
FIG. 13 is a graph showing a relation between a period of time elapsed since the application of external magnetic fields and the ratio of an output reproduced on the elapse of a preselected period of time to an output reproduced before the same particular to the third embodiment.

FIG. 13 compares the media Q2 and A1 with respect to the aging of recorded magnetization, i.e., the ratio of the reproduction output on the elapse of the preselected period of time to the reproduction output at t=1 second. As shown, the reproduction output of the medium Q2 does not fall at all while the reproduction output of the medium A1 falls. The FeTaN film of the medium Q2 is free from the decrease of magnetization because it does not have a domain wall structure. This is also true with the aging of recorded magnetization achievable with the medium whose FeTaN film is formed at room temperature, for the reason described in relation to the first embodiment.

It will thus be seen that the medium Q2 achieves an improved envelope characteristic at the time of recording and reproduction and obviates spike noise and the decrease or cancellation of recorded magnetization ascribable to the movement of a soft magnetic film or back layer. The medium Q2 therefore easily implements high recording density.

FOURTH EMBODIMENT

A perpendicular magnetic recording medium C2 was produced in the same manner as in the first embodiment except for the following. Use was made of a Co target and an $SiO_2$ target with a Co volume ratio of about 50% in a dispersion film. Sputtering was effected under the same film forming conditions as in the first example while applying a bias voltage to a substrate. As a result, a 500 nm thick Co—$SiO_2$ dispersion film was formed on the substrate as a soft magnetic layer or back layer. At the same time, another medium with an Co—SiO2 dispersion film formed at room temperature was produced.

The Co—$SiO_2$ dispersion film of the medium C2 showed no clear domain wall structure and showed no change even when a magnetic field was applied thereto little by little. This was also true with the Co—$SiO_2$ dispersion film formed at room temperature. This proves that the magnetization of the Co—$SiO_2$ film is not derived from the movement of a domain wall.

The Co—$SiO_2$ dispersion film of the medium C2 had a coercive force of 0.1 Oe. The Co—$SiO_2$ dispersion film formed at room temperature had a coercive force of 300 Oe. As for the recording and reproducing characteristics, the medium C2, like the medium A2, had a far sharper envelope than the conventional medium A1. Such a difference in envelope characteristic was also indicated by the results of experiments in which signals recorded by an ID head were read out by an MR head.

It will be seen from the above that the Co—$SiO_2$ dispersion film playing the role of a soft magnetic film or back layer fully solves the spike noise problem because it does not have a domain wall structure. The medium with the Co—$SiO_2$ dispersion film formed at room temperature also achieves the same advantages for the reason described in relation to the first embodiment.

Figure 14:
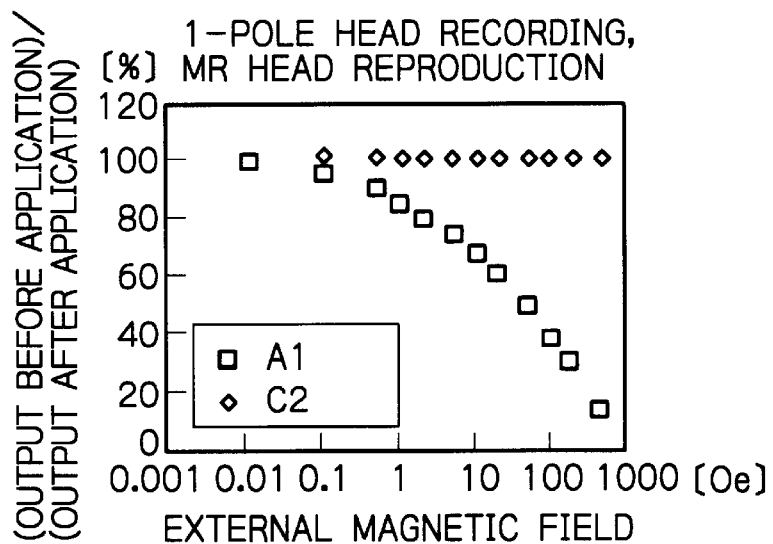
FIG. 14 is a graph showing a relation between external magnetic fields and the ratio of an output after the application of a magnetic field to an output before the application of the same particular to a fourth embodiment of the present invention.
Figure 15:
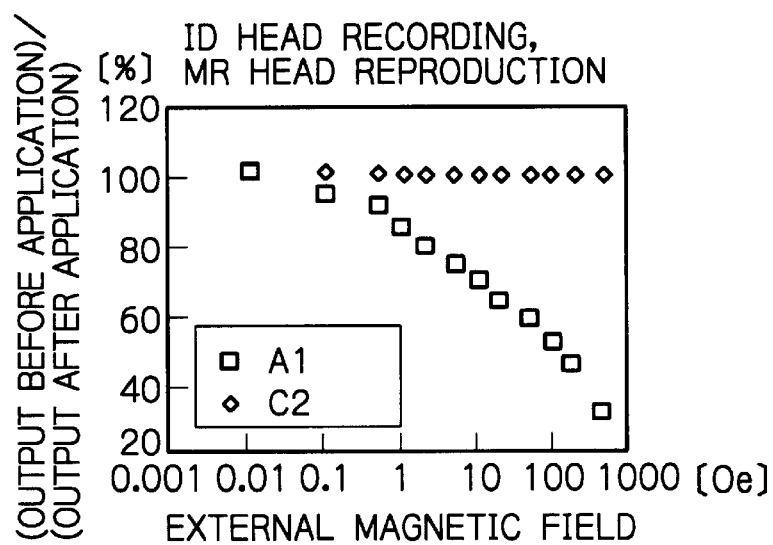
FIG. 15 is a graph showing another relation between external magnetic fields and the above ratio particular to the fourth embodiment.

FIG. 14 is a graph similar to FIG. 5, showing the stability of recorded magnetization achievable with the medium C2 against stray magnetic fields. As shown, the magnetization of the medium C2 does not decrease even when subjected to a magnetic field of 500 Oe. The medium C2 is therefore far superior to the medium A1 as to the stability of a recorded signal against external stray magnetic fields. This tendency was observed in exactly the same manner when signals recorded by an ID head were read out by an MR head, as shown in FIG. 15. The above stability of recorded magnetization was also attained with the medium with the Co—$SiO_2$ dispersion film formed at room temperature.

Figure 16:
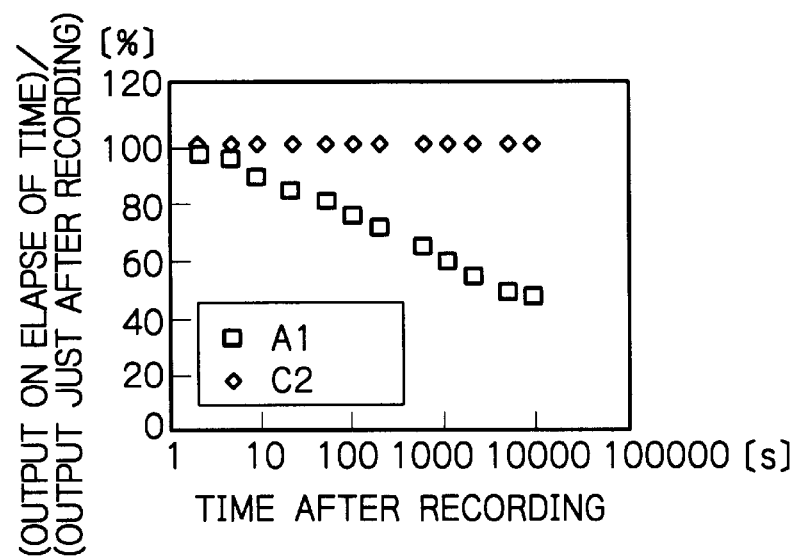
FIG. 16 is a graph showing a relation between a period of time elapsed since the application of external magnetic fields and the ratio of an output reproduced on the elapse of a preselected period of time to an output reproduced before the same particular to the fourth embodiment.

FIG. 16 compares the media C2 and A1 with respect to the aging of recorded magnetization, i.e., the ratio of the reproduction output on the elapse of the preselected period of time to the reproduction output at t=1 second. As shown, the reproduction output of the medium C2 does not fall at all while the reproduction output of the medium A1 falls. The Co—$SiO_2$ film of the medium C2 is free from the decrease of magnetization because it does not have a domain wall structure. This is also true with the aging of recorded magnetization achievable with the medium whose Co—SiO$_2$ dispersion film is formed at room temperature, for the reason described in relation to the first embodiment.

It will thus be seen that the medium C2 achieves an improved envelope characteristic at the time of recording and reproduction and obviates spike noise and the decrease or cancellation of recorded magnetization ascribable to the movement of a soft magnetic film or back layer. The medium C2 therefore easily implements high recording density.

FIFTH EMBODIMENT

A perpendicular magnetic recording medium D2 was produced in the same manner as in the first embodiment except for the following. Use was made of a Co target and a C target with a Co volume ratio of about 50% in a dispersion film. Sputtering was effected under the same film forming conditions as in the first example while applying a bias voltage to a substrate. As a result, a Co—C dispersion film was formed on the substrate as a soft magnetic layer or back layer.

The Co—C dispersion film of the medium D2 showed no clear domain wall structure and showed no change even when a magnetic field was applied thereto little by little. This was also true with a Co—C dispersion film formed at room temperature. This proves that the magnetization of the Co—C film is not derived from the movement of a domain wall.

The Co—C dispersion film of the medium D2 had a coercive force of 0.1 Oe. The Co—C dispersion film formed at room temperature had a coercive force of 300 Oe. As for the recording and reproducing characteristics, the medium D2, like the medium A2, had a far sharper envelope than the conventional medium A1. Such a difference in envelope characteristic was also indicated by the results of experiments in which signals recorded by an ID head were read out by an MR head.

It will be seen from the above that the Co—C dispersion film playing the role of a soft magnetic film or back layer fully solves the spike noise problem because it does not have a domain wall structure. The medium with the Co—C dispersion film formed at room temperature also achieves the same advantages for the reason described in relation to the first embodiment.

Figure 17:
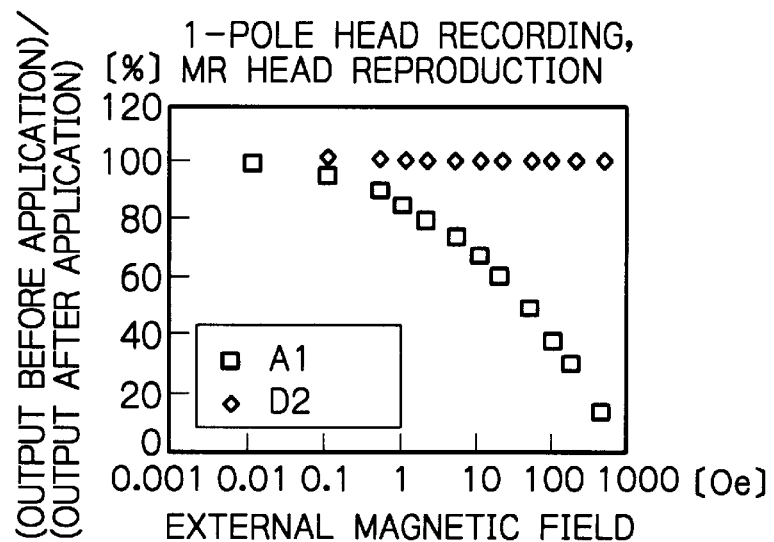
FIG. 17 is a graph showing a relation between external magnetic fields and the ratio of an output after the application of a magnetic field to an output before the application of the same particular to a fifth embodiment of the present invention.
Figure 18:
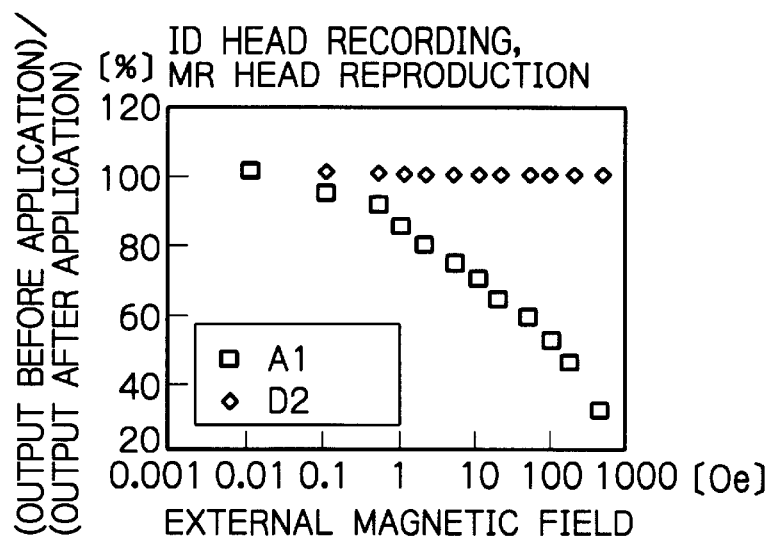
FIG. 18 is a graph showing another relation between external magnetic fields and the above ratio particular to the fifth embodiment.

FIG. 17 is a graph similar to FIG. 5, showing the stability of recorded magnetization achievable with the medium D2 against stray magnetic fields. As shown, the magnetization of the medium D2 does not decrease even when subjected to a magnetic field of 500 Oe. The medium D2 is therefore far superior to the medium A1 as to the stability of a recorded signal against external stray magnetic fields. This tendency was observed in exactly the same manner when signals recorded by an ID head were read out by an MR head, as shown in FIG. 18. The above stability of recorded magnetization was also attained with the medium with the Co—C dispersion film formed at room temperature.

Figure 19:
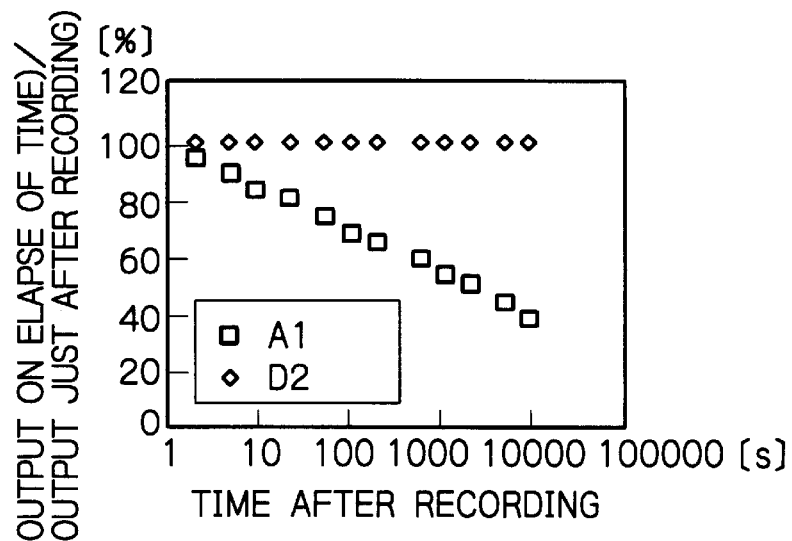
FIG. 19 is a graph showing another relation between a period of time elapsed since the application of external magnetic fields and the ratio of an output reproduced on the elapse of a preselected period of time to an output reproduced before the same particular to the fifth embodiment.

FIG. 19 compares the media D2 and A1 with respect to the aging of recorded magnetization, i. e., the ratio of the reproduction output on the elapse of the preselected period of time to the reproduction output at t=1 second. As shown, the reproduction output of the medium D2 does not fall at all while the reproduction output of the medium A1 falls. The Co—C film of the medium D2 is free from the decrease of magnetization because it does not have a domain wall structure. This is also true with the aging of recorded magnetization achievable with the medium whose Co—C dispersion film is formed at room temperature, for the reason described in relation to the first embodiment.

It will thus be seen that the medium D2 achieves an improved envelope characteristic at the time of recording and reproduction and obviates spike noise and the decrease or cancellation of recorded magnetization ascribable to the movement of a soft magnetic film or back layer. The medium D2 therefore easily implements high recording density.

SIXTH EMBODIMENT

A perpendicular magnetic recording medium E2 was produced in the same manner as in the first embodiment except for the following. Use was made of a CoPt target and an SiO$_2$ target with a CoPt volume ratio of about 50% in a dispersion film. Sputtering was effected under the same film forming conditions as in the first example while applying a bias voltage to a substrate. As a result, a 500 nm thick CoPt—SiO$_2$ dispersion film was formed on the substrate as a soft magnetic layer or back layer.

The CoPt—SiO$_2$ dispersion film of the medium E2 showed no clear domain wall structure and showed no change even when a magnetic field was applied thereto little by little. This was also true with a CoPt—SiO$_2$ dispersion film formed at room temperature. This proves that the magnetization of the CoPt—SiO$_2$ film is not derived from the movement of a domain wall.

The CoPt—SiO$_2$ dispersion film of the medium E2 had a coercive force of 0.1 Oe. The CoPt—SiO$_2$ dispersion film formed at room temperature had a coercive force of 300 Oe. As for the recording and reproducing characteristics, the medium E2, like the medium A2, had a far sharper envelope than the conventional medium A1. Such a difference in envelope characteristic was also indicated by the results of experiments in which signals recorded by an ID head were read out by an MR head.

It will be seen from the above that the CoPt—SiO$_2$ dispersion film playing the role of a soft magnetic film or back layer fully solves the spike noise problem because it does not have a domain wall structure. The medium with the CoPt—SiO$_2$ dispersion film formed at room temperature also achieves the same advantages for the reason described in relation to the first embodiment.

Figure 20:
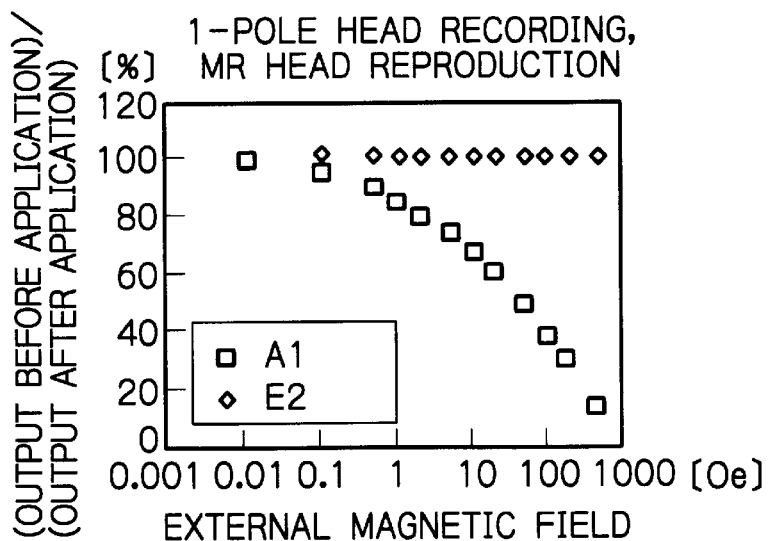
FIG. 20 is a graph showing a relation between external magnetic fields and the ratio of an output after the application of a magnetic field to an output before the application of the same particular to a sixth embodiment of the present invention.
Figure 21:
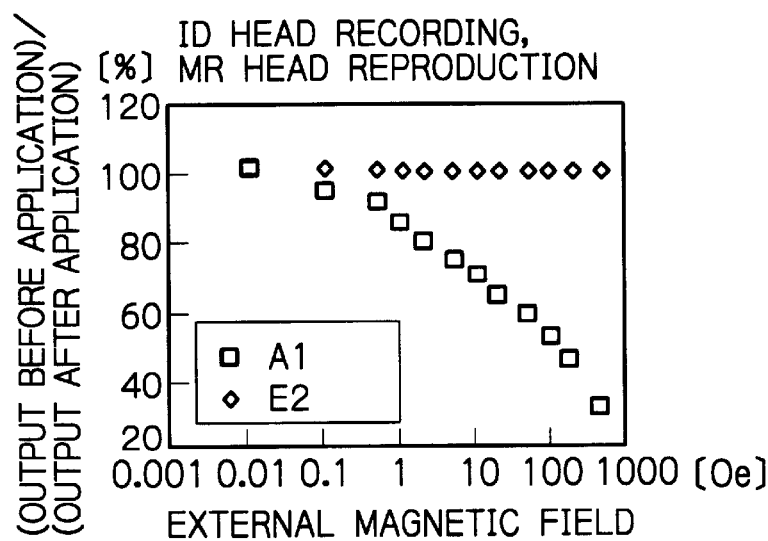
FIG. 21 is a graph showing another relation between external magnetic fields and the above ratio particular to the sixth embodiment.

FIG. 20 is a graph similar to FIG. 5, showing the stability of recorded magnetization achievable with the medium E2 against stray magnetic fields. As shown, the magnetization of the medium E2 does not decrease even when subjected to a magnetic field of 500 Oe. The medium E2 is therefore far superior to the medium A1 as to the stability of a recorded signal against external stray magnetic fields. This tendency was observed in exactly the same manner when signals recorded by an ID head were read out by an MR head, as shown in FIG. 21. The above stability of recorded magnetization was also attained with the medium with the CoPt—SiO$_2$ dispersion film formed at room temperature.

Figure 22:
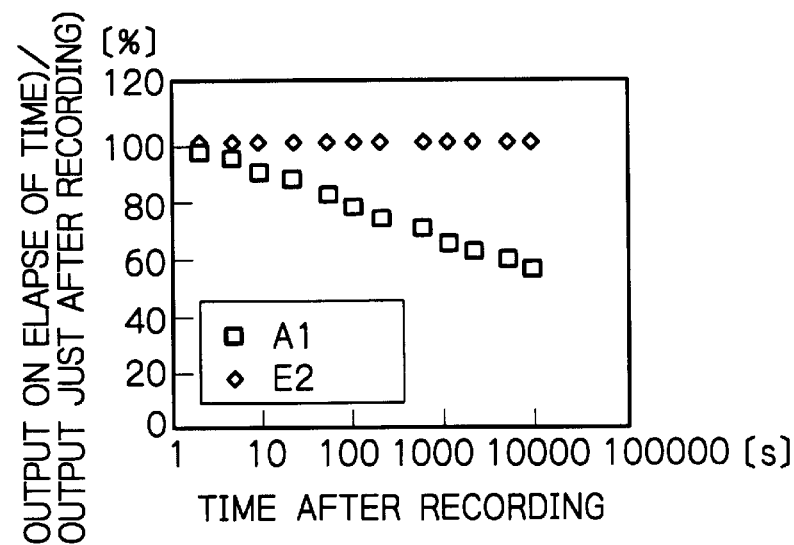
FIG. 22 is a graph showing a relation between a period of time elapsed since the application of external magnetic fields and the ratio of an output reproduced on the elapse of a preselected period of time to an output reproduced before the same particular to the sixth embodiment.

FIG. 22 compares the media E2 and A1 with respect to the aging of recorded magnetization, i.e., the ratio of the reproduction output on the elapse of the preselected period of time to the reproduction output at t=1 second. As shown, the reproduction output of the medium E2 does not fall at all while the reproduction output of the medium A1 falls. The CoPt—SiO$_2$ film of the medium E2 is free from the decrease of magnetization because it does not have a domain wall structure. This is also true with the aging of recorded magnetization achievable with the medium whose CoPt—SiO$_2$ dispersion film is formed at room temperature, for the reason described in relation to the first embodiment.

It will thus be seen that the medium E2 achieves an improved envelope characteristic at the time of recording and reproduction and obviates spike noise and the decrease or cancellation of recorded magnetization ascribable to the movement of a soft magnetic film or back layer. The medium E2 therefore easily implements high recording density.

SEVENTH EMBODIMENT

A perpendicular magnetic recording medium F2 was produced in the same manner as in the first embodiment except for the following. Use was made of a CoPt target and a C target with a CoPt volume ratio of about 50% in a dispersion film. Sputtering was effected under the same film forming conditions as in the first example while applying a bias voltage to a substrate. As a result, a 500 nm thick CoPt—C dispersion film was formed on the substrate as a soft magnetic layer or back layer.

The CoPt—C dispersion film of the medium F2 showed no clear domain wall structure and showed no change even when a magnetic field was applied thereto little by little. This was also true with a CoPt—C dispersion film formed at room temperature. This proves that the magnetization of the CoPt—C film is not derived from the movement of a domain wall.

The CoPt—C dispersion film of the medium F2 had a coercive force of 0.1 Oe. The CoPt—C dispersion film formed at room temperature had a coercive force of 300 Oe. As for the recording and reproducing characteristics, the medium F2, like the medium A2, had a sharper envelope than the conventional medium A1. Such a difference in envelope characteristic was also indicated by the results of experiments in which signals recorded by an ID head were read out by an MR head.

It will be seen from the above that the CoPt—C dispersion film playing the role of a soft magnetic film or back layer fully solves the spike noise problem because it does not have a domain wall structure. The medium with the CoPt—C dispersion film formed at room temperature also achieves the same advantages for the reason described in relation to the first embodiment.

Figure 23:
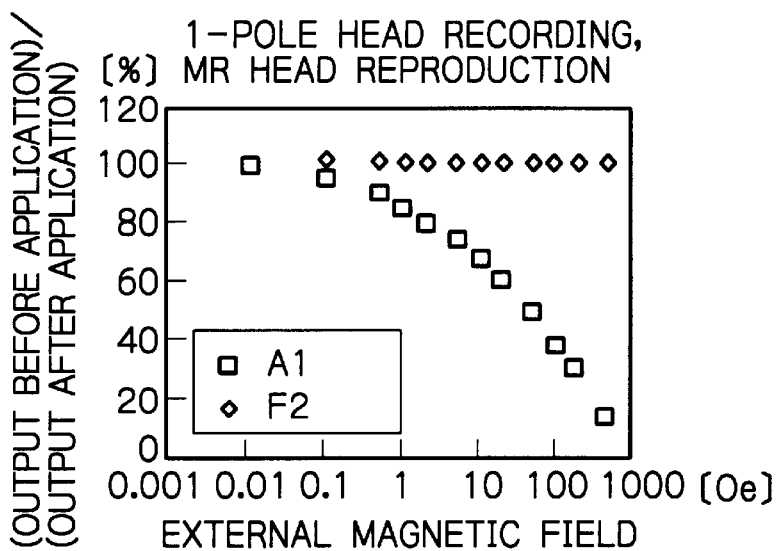
FIG. 23 is a graph showing a relation between external magnetic fields and the ratio of an output after the application of a magnetic field to an output before the application of the same particular to a seventh embodiment of the present invention.
Figure 24:
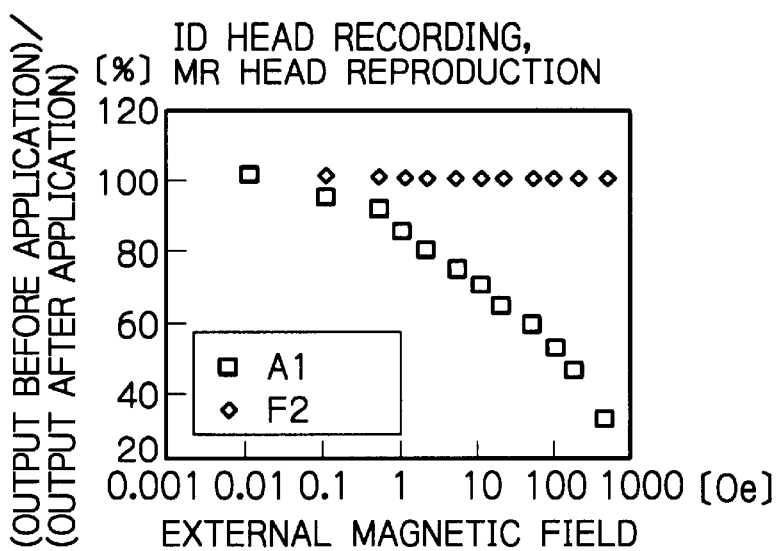
FIG. 24 is a graph showing another relation between external magnetic fields and the above radio particular to the seventh embodiment.

FIG. 23 is a graph similar to FIG. 5, showing the stability of recorded magnetization achievable with the medium F2 against stray magnetic fields. As shown, the magnetization of the medium F2 does not decrease even when subjected to a magnetic field of 500 Oe. The medium F2 is therefore far superior to the medium A1 as to the stability of a recorded signal against external stray magnetic fields. This tendency was observed in exactly the same manner when signals recorded by an ID head were read out by an MR head, as shown in FIG. 24. The above stability of recorded magnetization was also attained with the medium with the CoPt—C dispersion film formed at room temperature.

Figure 25:
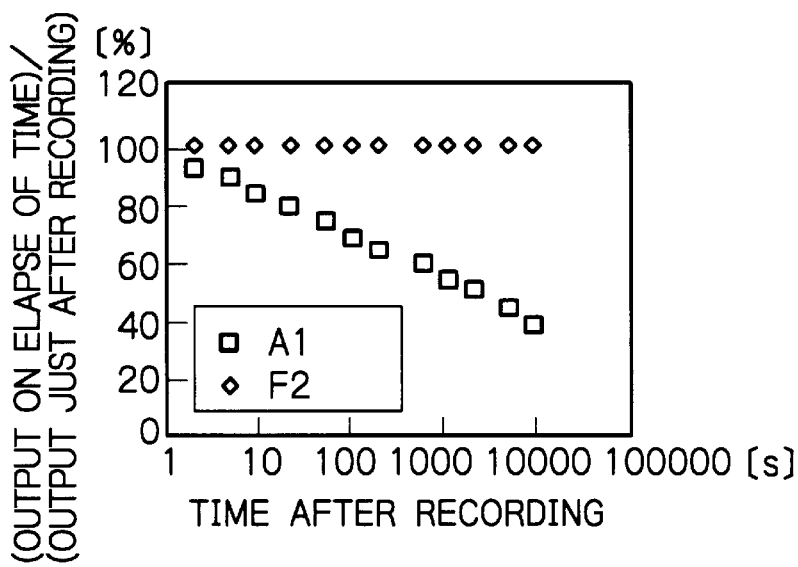
FIG. 25 is a graph showing a relation between a period of time elapsed since the application of external magnetic fields and the ratio of an output reproduced on the elapse of a preselected period of time to an output reproduced before the same particular to the seventh embodiment.

FIG. 25 compares the media F2 and A1 with respect to the aging of recorded magnetization, i.e., the ratio of the reproduction output on the elapse of the preselected period of time to the reproduction output at t=1 second. As shown, the reproduction output of the medium F2 does not fall at all while the reproduction output of the medium A1 falls. The CoPt—C film of the medium F2 is free from the decrease of magnetization because it does not have a domain wall structure. This is also true with the aging of recorded magnetization achievable with the medium whose CoPt—C dispersion film is formed at room temperature, for the reason described in relation to the first embodiment.

It will thus be seen that the medium F2 achieves an improved envelope characteristic at the time of recording and reproduction and obviates spike noise and the decrease or cancellation of recorded magnetization ascribable to the movement of a soft magnetic film or back layer. The medium F2 therefore easily implements high recording density.

EIGHTH EMBODIMENT

A perpendicular magnetic recording medium G2 was produced in the same manner as in the first embodiment except for the following. Use was made of a CoCrPt target and a $SiO_2$ target with a CoCrPt volume ratio of about 50% in a dispersion film. Sputtering was effected under the same film forming conditions as in the first example while applying a bias voltage to a substrate. As a result, a 500 nm thick CoCrPt—$SiO_2$ dispersion film was formed on the substrate as a soft magnetic layer or back layer.

The CoCrPt—$SiO_2$ dispersion film of the medium G2 showed no clear domain wall structure and showed no change even when a magnetic field was applied thereto little by little. This was also true with a CoCrPt—$SiO_2$ dispersion film formed at room temperature. This proves that the magnetization of the CoCrPt—$SiO_2$ film is not derived from the movement of a domain wall.

The CoCrPt—$SiO_2$ dispersion film of the medium G2 had a coercive force of 0.1 Oe. The CoCrPt—$SiO_2$ dispersion film formed at room temperature had a coercive force of 300 Oe. As for the recording and reproducing characteristic, the medium G2, like the medium A2, had a far sharper envelope than the conventional medium A1. Such a difference in envelope characteristic was also indicated by the results of experiments in which signals recorded by an ID head were read out by an MR head.

It will be seen from the above that the CoCrPt—$SiO_2$ dispersion film playing the role of a soft magnetic film or back layer fully solves the spike noise problem because it does not have a domain wall structure. The medium with the CoCrPt—$SiO_2$ dispersion film formed at room temperature also achieves the same advantages for the reason described in relation to the first embodiment.

Figure 26:
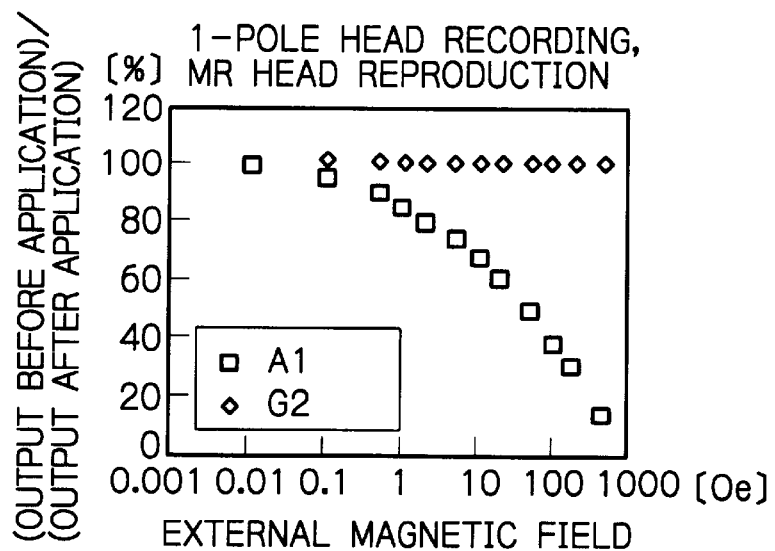
FIG. 26 is a graph showing a relation between external magnetic fields and the ratio of an output after the application of a magnetic field to an output before the application of the same particular to an eighth embodiment of the present invention.
Figure 27:
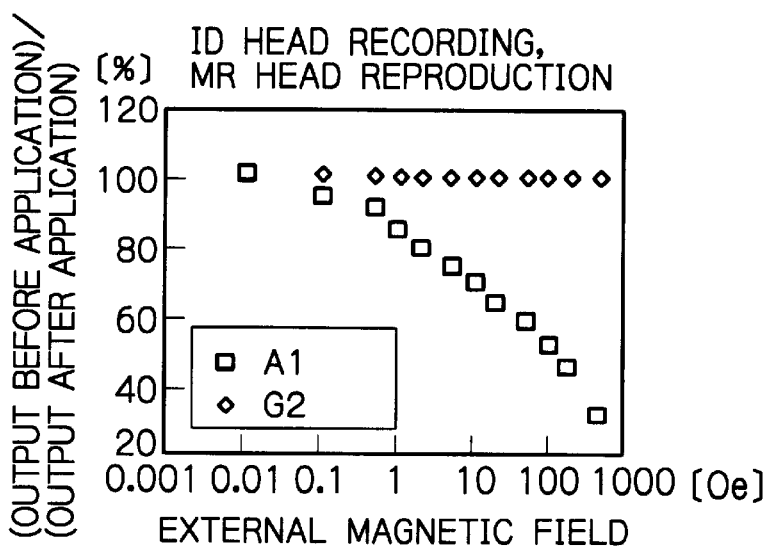
FIG. 27 is a graph showing another relation between external magnetic fields and the above ratio particular to the eighth embodiment.

FIG. 26 is a graph similar to FIG. 5, showing the stability of recorded magnetization achievable with the medium G2 against stray magnetic fields. As shown, the magnetization of the medium G2 does not decrease even when subjected to a magnetic field of 500 Oe. The medium G2 is therefore far superior to the medium A1 as to the stability of a recorded signal against external stray magnetic fields. This tendency was observed in exactly the same manner when signals recorded by an ID head were read out by an MR head, as shown in FIG. 27. The above stability of recorded magnetization was also attained with the medium with the CoCrPt—$SiO_2$ dispersion film formed at room temperature.

Figure 28:
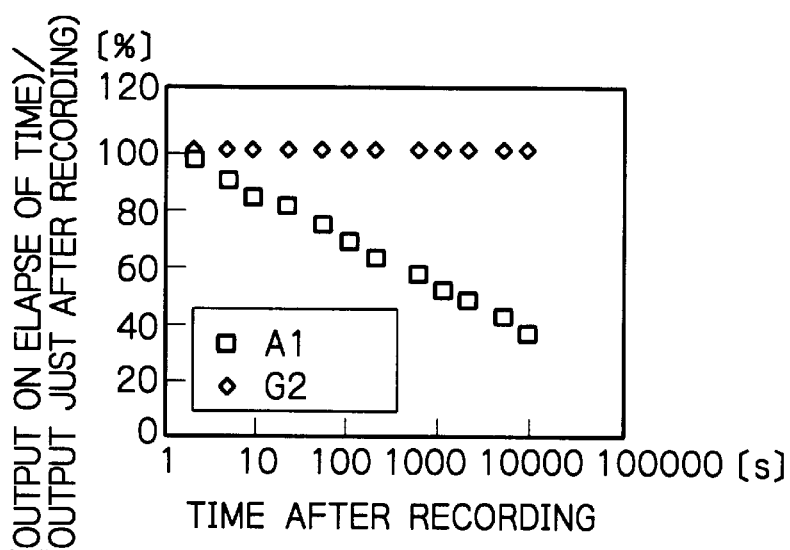
FIG. 28 is a graph showing a relation between a period of time elapsed since the application of external magnetic fields and the ratio of an output reproduced on the elapse of a preselected period of time to an output reproduced before the same particular to the eighth embodiment.

FIG. 28 compares the media G2 and A1 with respect to the aging of recorded magnetization, i. e., the ratio of the reproduction output on the elapse of the preselected period of time to the reproduction output at t=1 second. As shown, the reproduction output of the medium G2 does not fall at all while the reproduction output of the medium A1 falls. The CoCrPt—$SiO_2$ film of the medium G2 is free from the decrease of magnetization because it does not have a domain wall structure. This is also true with the aging of recorded magnetization achievable with the medium whose CoCrPt—$SiO_2$ dispersion film is formed at room temperature, for the reason described in relation to the first embodiment.

It will thus be seen that the medium G2 achieves an improved envelope characteristic at the time of recording and reproduction and obviates spike noise and the decrease or cancellation of recorded magnetization ascribable to the movement of a soft magnetic film or back layer. The medium G2 therefore easily implements high recording density.

NINTH EMBODIMENT

A perpendicular magnetic recording medium H2 was produced in the same manner as in the first embodiment except for the following. Use was made of a CoCrPt target and a C target with a CoCrPt volume ratio of about 50% in a dispersion film. Sputtering was effected under the same film forming conditions as in the first example while applying a bias voltage to a substrate. As a result, a 500 nm thick CoCrPt—C dispersion film was formed on the substrate as a soft magnetic layer or back layer.

The CoCrPt—C dispersion film of the medium H2 showed no clear domain wall structure and showed no change even when a magnetic field was applied thereto little by little. This was also true with a CoCrPt—C dispersion film formed at room temperature. This proves that the magnetization of the CoCrPt—C film is not derived from the movement of a domain wall.

The CoCrPt—C dispersion film of the medium H2 had a coercive force of 0.1 Oe. The CoCrPt—C dispersion film formed at room temperature had a coercive force of 300 Oe. As for the recording and reproducing characteristics, the medium H2, like the medium A2, had a far sharper envelope than the conventional medium A1. Such a difference in envelope characteristic was also indicated by the results of experiments in which signals recorded by an ID head were read out by an MR head.

It will be seen from the above that the CoCrPt—C dispersion film playing the role of a soft magnetic film or back layer fully solves the spike noise problem because it does not have a domain wall structure. The medium with the CoCrPt—C dispersion film formed at room temperature also achieves the same advantages for the reason described in relation to the first embodiment.

Figure 29:
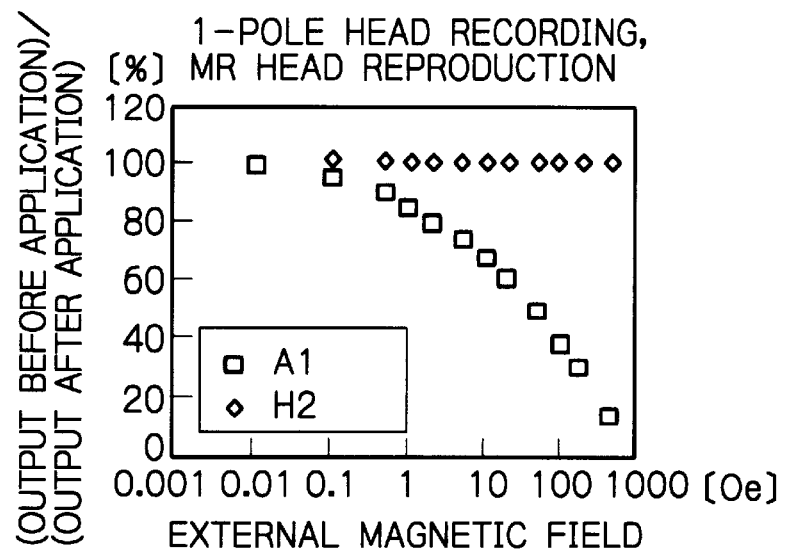
FIG. 29 is a graph showing a relation between external magnetic fields and the ratio of an output after the application of a magnetic field to an output before the application of the same particular to an ninth embodiment of the present invention.
Figure 30:
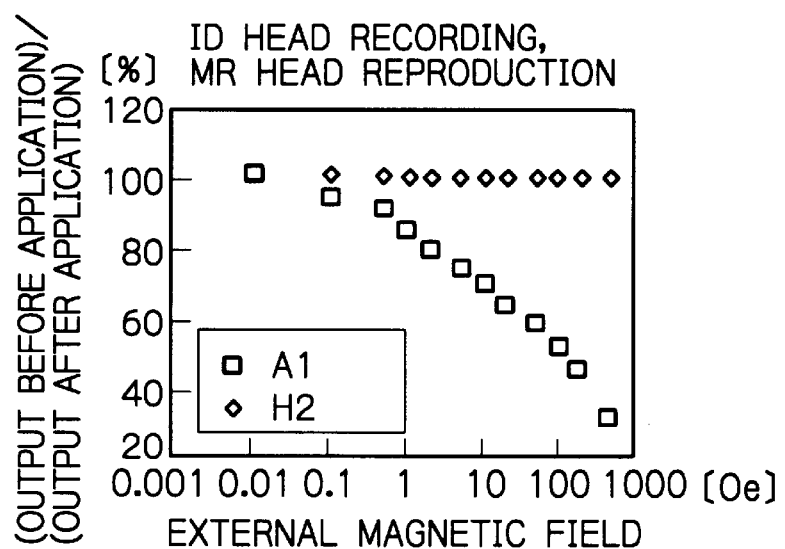
FIG. 30 is a graph showing another relation between external magnetic fields and the above ratio particular to the ninth embodiment.

FIG. 29 is a graph similar to FIG. 5, showing the stability of recorded magnetization achievable with the medium H2 against stray magnetic fields. As shown, the magnetization of the medium H2 does not decrease even when subjected to a magnetic field of 500 Oe. The medium H2 is therefore far superior to the medium A1 as to the stability of a recorded signal against external stray magnetic fields. This tendency was observed in exactly the same manner when signals recorded by an ID head were read out by an MR head, as shown in FIG. 30. The above stability of recorded magnetization was also attained with the medium with the CoCrPt—C dispersion film formed at room temperature.

Figure 31:
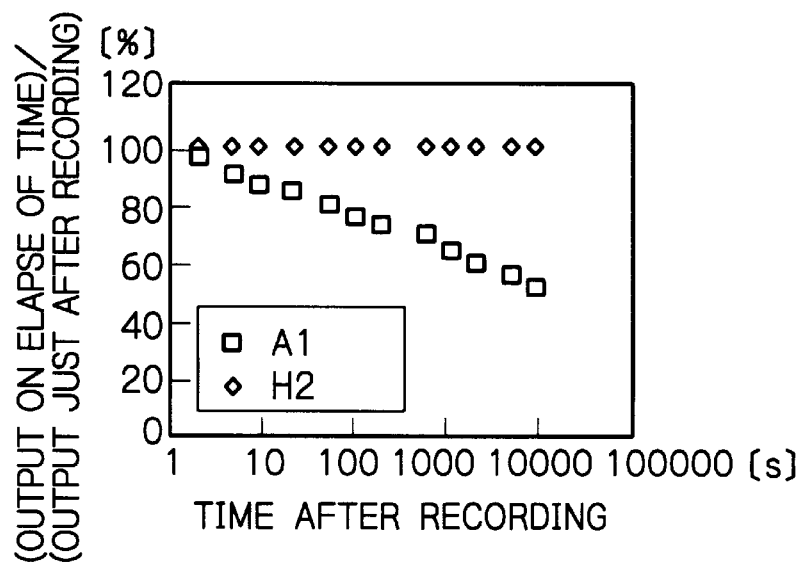
FIG. 31 is a graph showing a relation between a period of time elapsed since the application of external magnetic fields and the ratio of an output reproduced on the elapse of a preselected period of time to an output reproduced before the same particular to the ninth embodiment.

FIG. 31 compares the media H2 and A1 with respect to the aging of recorded magnetization, i.e., the ratio of the reproduction output on the elapse of the preselected period of time to the reproduction output at t=1 second. As shown, the reproduction output of the medium H2 does not fall at all while the reproduction output of the medium A1 falls. The CoCrPt—C film of the medium H2 is free from the decrease of magnetization because it does not have a domain wall structure. This is also true with the aging of recorded magnetization achievable with the medium whose CoCrPt—C dispersion film was formed at room temperature, for the reason described in relation to the first embodiment.

It will thus be seen that the medium H2 achieves an improved envelope characteristic at the time of recording and reproduction and obviates spike noise and the decrease or cancellation of recorded magnetization ascribable to the movement of a soft magnetic film or back layer. The medium H2 therefore easily implements high recording density.

TENTH EMBODIMENT

By using a CoPt target and an $SiO_2$ target with a CoPt volume ratio of about 50% in a dispersion film, sputtering is effected at the same time under the following conditions while applying a bias to 2.5 inch thick substrates:

Initial chamber vacuum: below $5 \times 10^{-7}$ mTorr
Substrate Temperature: 600° C.
Power: 0.5 kW
Argon gas pressure: 4 mTorr
Film forming rate: 3 nm/sec As a result, a 500 nm thick CoPt—$SiO_2$ dispersion film was formed on each substrate as a soft magnetic film or under lay. Subsequently, by using a $Co_{65}Cr_{35}$ (at %) target and a $Co_{78}Cr_{19}Ta_3$ target, a $Co_{65}Cr_{35}$ film was formed on the CoPt—$SiO_2$ dispersion films at a substrate temperature of 200° C. with thickenesses of 0 nm, 10 nm, 20 nm, 50 nm, 100 nm, and 120 nm. Then, a 100 nm thick $Co_{78}Cr_{19}Ta_3$ film was formed on each $Cr_{65}Cr_{35}$ film. Further, a 10 nm thick C protection layer was formed on each $Co_{78}Cr_{19}Ta_3$ film. The medium with the 100 nm $Co_{65}Cr_{35}$ film is a medium J2 of the illustrative embodiment while the medium with 0 nm thick $Co_{65}Cr_{35}$ film, i.e., lacking such a film is a conventional medium B1.

The characteristics of the medium J2 including surface smoothness, perpendicular orientation, coercive force and recording and reproducing characteristics were estimated, as follows. The same estimation was also applied to an eleventh embodiment and successive embodiments to follow.

FIG. 32 lists the surface smoothness Ra of the $Co_{65}Cr_{35}$ film of the medium J2 measured by a magnetic-force microscope (AFM). As shown, when the film thickness is 0 nm, the surface smoothness of CoPt—$SiO_2$ dispersion film is the surface smoothness Ra. As the thickness of the $Co_{65}Cr_{35}$ film increases from 10 nm to 100 nm, the smoothness Ra decreases, indicating that the smoothness is improved. However, the smoothness is degraded when the film thickness exceeds 100 nm.

A perpendicular orientation was examined with each of the $Co_{78}Cr_{19}Ta_3$ films respectively having 0 nm to 120 nm thick $Co_{65}Cr_{35}$ films beneath them. For the examination, X-ray analysis was used to produce the half width of a hcp(002) peak locking curve. FIG. 33 tabulates the results of examination. As shown, as the film thickness increases from 10 nm to 100 nm, the half value of the locking curve decreases, indicating that the perpendicular orientation of the $Co_{78}Cr_{19}Ta_3$ film is improved. The $Co_{78}Cr_{19}Ta_3$ film on each CoPt—$SiO_2$ dispersion film is not a perfect perpendicular magnetization film, but a 10 nm to 20 nm initial layer formed at the initial stage of film formation exists. Despite such an initial layer, a highly anisotropic film with desirable crystal orientation is formed from the initial stage of film formation because the $Co_{65}Cr_{35}$ film and $Co_{78}Cr_{19}Ta_3$ film are extremely close in crystal structure to each other. However, when the film thickness exceeds 100 nm, the half value of the locking curve increases, indicating that the perpendicular orientation of the $Co_{78}Cr_{19}Ta_3$ film is degraded.

It will be seen from the above that the intermediate $Co_{65}Cr_{35}$ film improves both the surface smoothness of the CoPt—$SiO_2$ dispersion film and the perpendicular orientation of the $Co_{78}Cr_{19}{}_{Ta3}$ film.

A magnetic characteristic was determined with each of the $Co_{78}Cr_{19}Ta_3$ films respectively having the 0 nm to 120 nm thick $Co_{65}Cr_{35}$ films beneath them by a Kerr effect measuring device. FIG. 34 shows the results of measurement in terms of the square ratio of a major loop. As shown, as the thickness of the $Co_{65}Cr_{35}$ film increases from 10 nm to 100 nm, the square ratio is improved. However, the square ratio is degraded when the film thickness exceeds 100 nm.

The recording and reproducing characteristics of the media J2 and B1 were estimated by use of a composite ID/MR head. The head had a recording track width of 4 μm, a reproduction track width of 3 μm, a recording gap length of 0.4 μm, and a reproduction gap length of 0.32 μm. The estimation was effected with a record current of 10 mAop, a sense current of 12 mA, a peripheral speed of 12.7 m/sec, a flight of 45 nm, and a noise band of 45 MHz.

FIG. 35 plots the dependency of medium noise on recording density. As shown, the J2 is smaller in medium noise than the medium B1 over the entire recording density range, i.e., features a highly desirable noise characteristic. That is, the intermediate $Co_{65}Cr_{35}$ layer improves the surface smoothness of the $CoPt-SiO_2$ dispersion film and the perpendicular orientation of the $Co_{78}Cr_{19}Ta_2$ film at the same time. This improves the square ratio of the magnetic characteristic of the $Co_{78}Cr_{19}Ta_3$ perpendicular magnetization film and thereby reduces the thickness of the initial layer and therefore noise. This is also true with the medium having the intermediate $Co_{65}Cr_{35}$ layer less than 100 nm thick.

FIG. 36 shows the dependency of medium S/N ratio on recording density. As shown, the medium J2 is higher in S/N ratio than the medium B1 by 2 dB to 5 dB over the entire recording density range and is therefore desirably adaptive to high recording density. That is, the medium J2 readily implements dense data recording.

ELEVENTH EMBODIMENT

A 500 nm thick $CoCrPt-SiO_2$ dispersion film or soft magnetic film was formed on substrates in the same manner as in the tenth embodiment except that the CoCrPt volume ratio in a dispersion film was 50% and that a CoCrPt target and an $SiO_2$ target were used. Subsequently, by using a Ti target and a $Co_{78}Cr_{19}Ta_3$ (at %) target, 0 nm, 10 nm, 20 nm, 50 nm, 100 nm and 120 nm thick Ti films were formed on respective $CoCrPt-SiO_2$ dispersion films at a substrate temperature of 200° C. Then, a 100 nm thick $Co_{78}Cr_{19}Ta_3$ film was formed on each Ti film. Further, a 10 nm thick C protection layer was formed on each $Co_{78}Cr_{19}Ta_3$ film. The medium with the 100 nm thick Ti film is a medium K2 of the illustrative embodiment while the medium without the Ti film is a conventional medium C1.

FIG. 37 lists the surface smoothnesses Ra of the Ti films. As shown, when the film thickness is 0 nm, the surface smoothness of $CoCrPt-SiO_2$ dispersion film is the surface smoothness Ra. As the thickness of the Ti film increases from 10 nm to 100 nm, the smoothness Ra decreases, indicating that the smoothness is improved. However, the smoothness is degraded when the film thickness exceeds 100 nm.

A perpendicular orientation was examined with each of the $Co_{78}Cr_{19}Ta_3$ films respectively having 0 nm to 120 nm Ti films beneath them. FIG. 33 tabulates the results of examination. As shown, as the film thickness increases from 10 nm to 100 nm, the half value of a locking curve decreases, indicating that the perpendicular orientation of the $Co_{78}Cr_{19}Ta_3$ film is improved. The $Co_{78}Cr_{19}Ta_3$ film on each $CoCrPt-SiO_2$ dispersion film is not a perfect perpendicular magnetization film, but a 10 nm to 20 nm initial layer formed at the initial stage of film formation exists. Despite such an initial layer, a highly anisotropic film with desirable crystal orientation is formed from the initial stage of film formation because the Ti film and $Co_{78}Cr_{19}Ta_3$ film are desirable in lattice matching. However, when the film thickness exceeds 100 nm, the half value of the locking curve increases, indicating that the perpendicular orientation of the $Co_{78}Cr_{19}Ta_3$ film is degraded.

It will be seen from the above that the intermediate Ti film improves both the surface smoothness of the $CoCrPt-SiO_2$ dispersion film and the perpendicular orientation of the $Co_{78}Cr_{19}Ta_3$ film.

Figures 38, 39, 40:
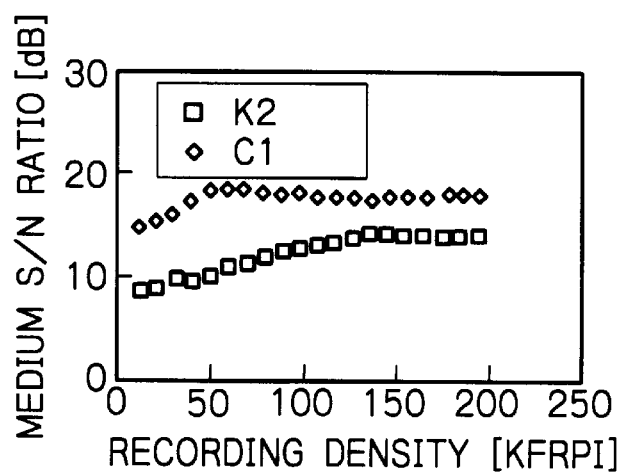
FIG. 38 is a table showing a relation between the thickness of the intermediate layer and the perpendicular orientation of a CoCrTa film particular to the eleventh embodiment.
FIG. 39 is a table showing a relation between the thickness of the intermediate layer and the square ratio of the CoCrTa film particular to the eleventh embodiment.
FIG. 40 is a graph showing the dependency of medium noise on recording density particular to the eleventh embodiment.

A magnetic characteristic was determined with each of the $Co_{78}Cr_{19}Ta_3$ films respectively having the 0 nm to 120 nm thick Ti films beneath them. FIG. 39 shows the results of measurement. As shown, as the thickness of the Ti film increases from 10 nm to 100 nm, the square ratio is improved. However, the square ratio is degraded when the film thickness exceeds 100 nm.

The recording and reproducing characteristics of the media K2 and C1 were estimated. FIG. 40 plots the dependency of medium noise on recording density. As shown, the medium K2 is smaller in medium noise than the medium C1 over the entire recording density range, i.e., features a highly desirable noise characteristic. That is, the intermediate Ti layer improves the surface smoothness of the $CoPt-SiO_2$ dispersion film and the perpendicular orientation of the $Co_{78}Cr_{19}Ta_3$ film at the same time, so that the square ratio of the $Co_{78}Cr_{19}T_3$ film is improved. This is successful to reduce the thickness of the initial layer and therefore noise. This is also true with the medium having the intermediate Ti layer less than 100 nm thick.

Figures 41, 42, 43:
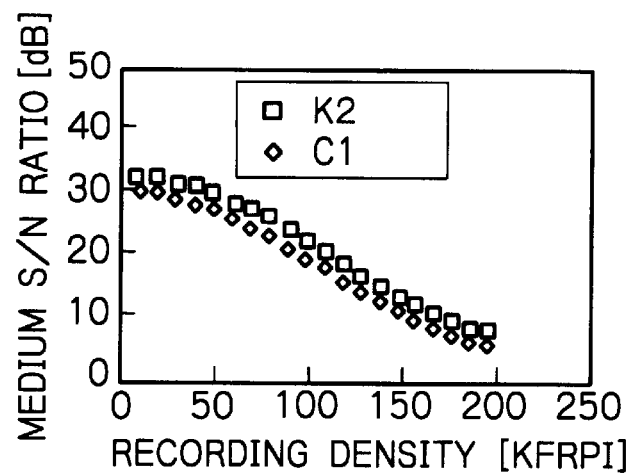
FIG. 41 is a graph showing the dependency of a medium S/N ratio on recording density particular to the tenth embodiment.
FIG. 42 is a table showing a relation between the thickness and the surface smoothness of an intermediate layer included in a twelfth embodiment of the present invention.
FIG. 43 is a table showing a relation between the thickness of the intermediate layer and the perpendicular orientation of a CoCrTa film particular to the twelfth embodiment.

FIG. 41 shows the dependency of medium S/N ratio on recording density. As shown, the medium K2 is higher in S/N ratio than the medium C1 by 1 dB to 2 dB over the entire recording density range and is therefore desirably adaptive to high recording density. That is, the medium K2 readily implements dense data recording.

TWELFTH EMBODIMENT

A 500 nm thick CoCrPt—C dispersion film or soft magnetic film was formed on substrates in the same manner as in the tenth embodiment except that the CoCrPt volume ratio in a dispersion film was about 50% and that a CoCrPt target and a C target were used. Subsequently, by using a $Cr_{20}Ti_{80}$ target and a $Co_{78}Cr_{19}Ta_3$ (at %) target, 0 nm, 10 nm, 20 nm, 50 nm, 100 nm and 120 nm thick $Cr_{20}Ti_{80}$ films were formed on respective CoCrPt—C dispersion films at a substrate temperature of 200° C. Then, a 100 nm thick $Co_{78}Cr_{19}Ta_3$ film was formed on each $Cr_{20}Ti_{80}$ film. Further, a 10 nm thick C protection layer was formed on each $Co_{78}Cr_{19}Ta_3$ film. The medium with the 100 nm thick $Cr_{20}Ti_{80}$ film is a medium L2 of the illustrative embodiment while the medium without the $Cr_{20}Ti_{80}$ film is a conventional medium C1.

FIG. 42 lists the surface smoothnesses Ra of the $Cr_{20}Ti_{80}$ films. As shown, when the film thickness is 0 nm, the surface smoothness of CoCrPt—C dispersion film is the surface smoothness Ra. As the thickness of the $Cr_{20}Ti_{80}$ film increases from 10 nm to 100 nm, the smoothness Ra decreases, indicating that the smoothness is improved. However, the smoothness is degraded when the film thickness exceeds 100 nm.

A perpendicular orientation was examined with each of the $Co_{78}Cr_{19}Ta_3$ films respectively having 0 nm to 120 nm thick $Cr_{20}Ti_{80}$ films beneath them. FIG. 33 tabulates the results of examination. As shown, as the film thickness increases from 10 nm to 100 nm, the half value of a locking curve decreases, indicating that the perpendicular orientation of the $Co_{78}Cr_{19}Ta_3$ film is improved. The $Co_{78}Cr_{19}Ta_3$ film on each CoCrPt—C dispersion film is not a perfect perpendicular magnetization film, but a 10 nm to 20 nm initial layer formed at the initial stage of film formation exists. Despite such an initial layer, a highly anisotropic film with desirable crystal orientation is formed from the initial stage of film formation because the $Cr_{20}Ti_{80}$ film and $Co_{78}Cr_{19}Ta_3$ film are desirable in lattice matching. However, when the film thickness exceeds 100 nm, the half value of the locking curve increases, indicating that the perpendicular orientation of the $Co_{78}Cr_{19}Ta_3$ film is degraded.

It will be seen from the above that the intermediate $Cr_{20}Ti_{80}$ film improves both the surface smoothness of the CoCrPt—C dispersion film and the perpendicular orientation of the $Co_{78}Cr_{19}Ta_3$ film.

A magnetic characteristic was determined with each of the $Co_{78}Cr_{19}Ta_3$ films respectively having the 0 nm to 120 nm thick $Cr_{20}Ti_{80}$ films beneath them. FIG. 44 shows the results of measurement. As shown, as the thickness of the $Cr_{20}Ti_{80}$ film increases from 10 nm to 100 nm, the square ratio is improved. However, the square ratio is degraded when the film thickness exceeds 100 nm.

The recording and reproducing characteristics of the media L2 and D1 were estimated. FIG. 45 plots the dependency of medium noise on recording density. As shown, the medium L2 is smaller in medium noise than the medium D1 over the entire recording density range, i.e., features a highly desirable noise characteristic. That is, the intermediate $Cr_{20}Ti_{80}$ layer improves the surface smoothness of the CoPt—C dispersion film and the perpendicular orientation of the $Co_{78}Cr_{19}Ta_3$ film at the same time, so that the square ratio of the $Co_{78}Cr_{19}T_3$ film is improved. This is successful to reduce the thickness of the initial layer and therefore noise. This is also true with the medium having the intermediate $Cr_{20}Ti_{80}$ layer less than 100 nm thick.

FIG. 46 shows the dependency of medium S/N ratio on recording density. As shown, the medium L2 is higher in S/N ratio than the medium D1 by 1 dB to 4 dB over the entire recording density range and is therefore desirably adaptive to high recording density. That is, the medium L2 readily implements dense data recording.

THIRTEENTH EMBODIMENT

A Cr target was used to form 0 nm, 100 nm, 200 nm, 300 nm, 400 nm and 500 nm thick Cr films on respective 2.5 inch substrates by sputtering at a substrate temperature of 600° C. Then, a 500 nm CoPt—$SiO_2$ dispersion film, a 100 nm $Co_{78}Cr_{19}Ta$ film and a 10 nm C protection layer were formed on each Cr film in the same manner as in the tenth embodiment. The medium with the 500 nm thick Cr film is a medium M2 of the illustrative embodiment while the medium with the CoPt—$SiO_2$ dispersion film and $Co_{78}Cr_{19}Ta_3$ film is a conventional medium E1.

Figures 47, 48, 49:
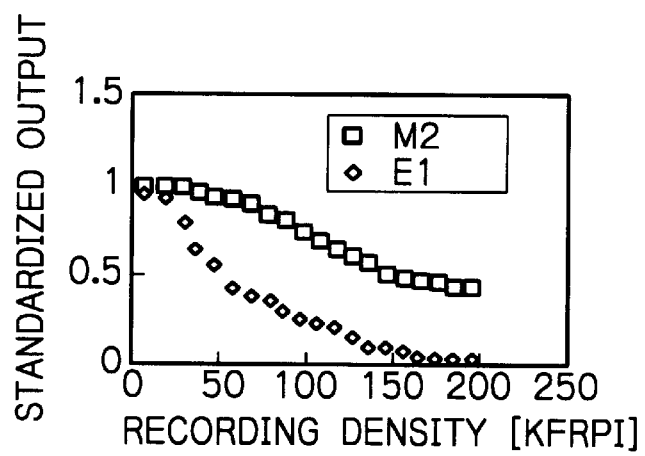
FIG. 47 is a table showing a relation between the thickness and the coercive force of a soft magnetic film or back layer particular to a thirteenth embodiment of the present invention.
FIG. 48 is a graph showing the dependency of an output on recording density particular to the thirteenth embodiment.
FIG. 49 is a table listing a medium S/N ratio achievable with the thirteenth embodiment.

A coercive force was measured with each of the CoPt—$SiO_2$ film with the Cr film or back layer and the CoPt—$SiO_2$ film without it by a VSM. FIG. 47 lists the results of measurement. As shown, the coercive force of the CoPt—$SiO_2$ dispersion film increases with an increase in the thickness of the Cr film.

The recording and reproducing characteristics of the medium M2 and those of the medium E1 were estimated under the same conditions as in the tenth embodiment. FIG. 48 show the dependency of medium noise on recording density determined by the estimation. In FIG. 48, both of the media M2 and E1 are standardized in terms of the output value of an isolated wave (corresponding to a recording density of 10 kFRPI). As shown, the output of the medium M2 attenuates more slowly than the output of the medium E1 in accordance with the increase of recording density. Stated another way, a higher output is achievable with the medium M2 than with the medium E1 up to high recording densities. In this manner, the Cr film or back layer beneath the CoPt—$SiO_2$ layer increases the coercive force and improves the dependency of the output on recording density.

FIG. 49 shows the dependency of medium S/N ratio on recording density at the recording density of 400 kFRPI. As shown, the medium M2 is higher in S/N ratio than the medium E1 by about 2 dB even at a high recording density and therefore desirably adaptive to high recording density. That is, the medium M2 readily implements dense data recording.

FOURTEENTH EMBODIMENT

A V target was used in place of the Cr target of the thirteenth embodiment in order to form 0 nm, 100 nm, 200 nm, 300 nm thick, 400 nm and 500 nm thick V films on respective 2.5 inch substrates by sputtering at a substrate temperature of 600° C. Then, perpendicular media were produced in the same manner as in the eleventh embodiment. The medium with the 500 nm thick V film is a medium N2 of the illustrative embodiment while the medium with the CoPt—$SiO_2$ dispersion film and $Co_{78}Cr_{19}Ta_3$ film is a conventional medium F1.

Figures 50, 51, 52:
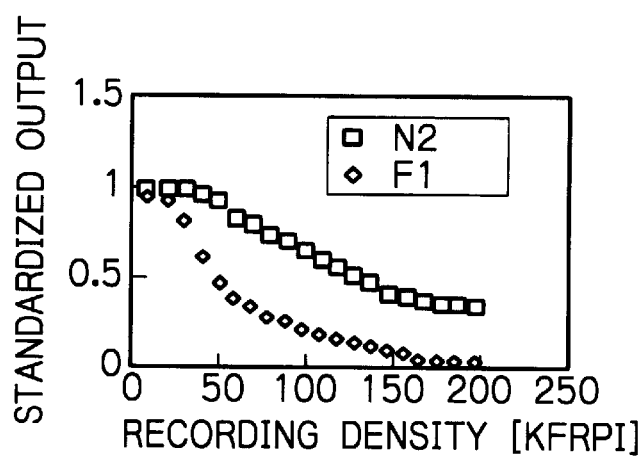
FIG. 50 is a table showing a relation between thickness and the coercive force of a soft magnetic film or back layer particular to a fourteenth embodiment of the present invention.
FIG. 51 is a graph showing the dependency of an output on recording density particular to the fourteenth embodiment.
FIG. 52 is a table listing a medium S/N ratio achievable with the fourteenth embodiment.

A coercive force was measured with each of the CoPt—$SiO_2$ films with the V film or back layer and the CoPt—$SiO_2$ film without it, as in the thirteenth embodiment. FIG. 50 lists the results of measurement. As shown, the coercive force of the CoPt—$SiO_2$ dispersion film increases with an increase in the thickness of the V film.

The recording and reproducing characteristics of the medium N2 and those of the medium F1 were estimated, as in the thirteenth embodiment. FIG. 51 show the dependency of medium noise on recording density determined by the estimation. In FIG. 51, both of the media N2 and F1 are standardized in terms of the output value of an isolated wave (corresponding to a recording density of 10 kFRPI). As shown, the output of the medium N2 attenuates more slowly than the output of the medium F1 in accordance with the increase of recording density. Stated another way, a higher output is achievable with the medium N2 than with the medium F1 up to high recording densities. In this manner, the V film or back layer beneath the CoCrPt—$SiO_2$ layer increases the coercive force and improves the dependency of the output on recording density.

FIG. 52 shows the dependency of medium S/N ratio on recording density at the recording density of 400 kFRPI. As shown, the medium N2 is higher in S/N ratio than the medium F1 by about 2 dB even at a high recording density and therefore desirably adaptive to high recording density. That is, the medium N2 readily implements dense data recording.

FIFTEENTH EMBODIMENT

A Cu target was used in place of the Cr target of the thirteenth embodiment in order to form 0 nm, 100 nm, 200 nm, 300 nm, 400 nm and 500 nm thick Cu films on respective 2.5 inch substrates by sputtering at a substrate temperature of 600° C. Then, perpendicular media were produced in the same manner as in the twelfth embodiment. The medium with the 500 nm thick Cu film is a medium P2 of the illustrative embodiment while the medium with the CoCrPt—C dispersion film and $Co_{78}Cr_{19}Ta_3$ film is a conventional medium G1.

Figures 53, 54, 55:
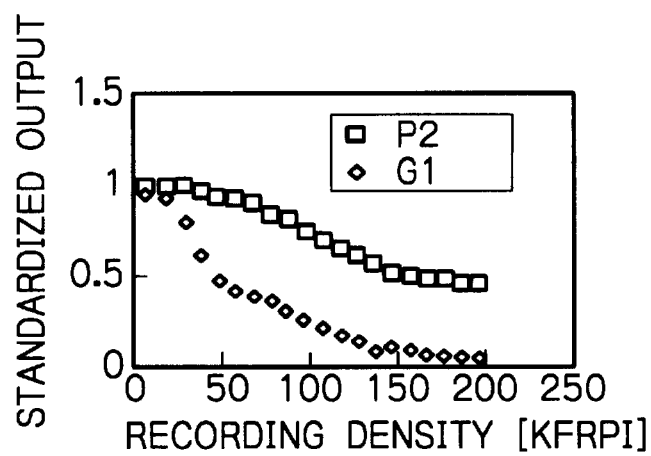
FIG. 53 is a table showing a relation between thickness and the coercive force of a soft magnetic film or back layer particular to a fifteenth embodiment of the present invention.
FIG. 54 is a graph showing the dependency of an output on recording density particular to the fifteenth embodiment.
FIG. 55 is a table listing a medium S/N ratio achievable with the fifteenth embodiment.

A coercive force was measured with each of the CoCrPt—C film with the Cu film or back layer and the CoCrPt—C film without it, as in the thirteenth embodiment. FIG. 53 lists the results of measurement. As shown, the coercive force of the CoCrPt—C dispersion film increases with an increase in the thickness of the Cu film.

The recording and reproducing characteristics of the medium P2 and those of the medium G1 were estimated, as in the thirteenth embodiment. FIG. 54 show the dependency of medium noise on recording density determined by the estimation. In FIG. 54, both of the media P2 and G1 are standardized in terms of the output value of an isolated wave (corresponding to a recording density of 10 kFRPI). As shown, the output of the medium P2 attenuates more slowly than the output of the medium G1 in accordance with the increase of recording density. Stated another way, a higher output is achievable with the medium P2 than with the medium G1 up to high recording densities. In this manner, the Cu film or back layer beneath the CoCrPt—$SiO_2$ layer increases the coercive force and improves the dependency of the output on recording density.

FIG. 55 shows the dependency of medium S/N ratio on recording density at the recording density of 400 kFRPI. As shown, the medium P2 is higher in S/N ratio than the medium G1 by about 2 dB even at a high recording density and therefore desirably adaptive to high recording density. That is, the medium P2 readily implements dense data recording.

In summary, it will be seen that the present invention provides a perpendicular magnetic recording medium having various unprecedented advantages, as enumerated below.

(1) A soft magnetic film playing the role of a back layer, but not having a domain wall structure, is positioned beneath a perpendicular magnetization film. Such a back layer improves the envelope characteristic of the medium at the time of recording and reproduction. Moreover, the medium is free from spike noise and the decrease or cancellation of recorded magnetization ascribable to the movement of the domain wall of the back layer. The medium of the present invention is therefore a drastic solution to the problems particular to the conventional perpendicular magnetic recording medium and realizes desirable recording and reproducing characteristics.

(2) A junction layer intervenes between a granular thin layer serving as the soft magnetic layer and a perpendicular magnetization layer. The junction layer improves the surface smoothness of the soft magnetic layer and the perpendicular orientation of the magnetization layer at the same time. This successfully increases the square ratio of the magnetic characteristic of the magnetization layer and thereby reduces medium noise.

(3) A Cr film, a V film or a Cu film intervenes between the granular thin film and a substrate. This successfully enhances the independence of granules dispersed in a parent material and thereby increases a coercive force, compared to the conventional laminate lacking the above intermediate layer. This improves the dependency of reproduced output on recording density.

Various modifications will become possible for those skilled in the art after receiving the teachings of the present disclosure without departing from the scope thereof.

What is claimed is:

1. A perpendicular magnetic recording medium comprising:
    a substrate;
    a soft magnetic film formed on said substrate; and
    a perpendicular magnetization film formed on said soft magnetic film;
    said soft magnetic film being formed of a material not having a domain wall structure and having a coercive force of less than 300 Oe inclusive.

2. A medium as claimed in claim 1, wherein said soft magnetic film is formed of either one of FeSiAl and an FeSiAl alloy.

3. A medium as claimed in claim 2, further comprising a junction layer having a thickness of less than 100 nm inclusive and intervening between said soft magnetic film and said perpendicular magnetization film.

4. A medium as claimed in claim 3, wherein said junction layer is formed of one of $Co_{1-x}Cr_x$ ($0.25 \leq x \leq 0.60$), Ti and CrTi.

5. A medium as claimed in claim 1, wherein said soft magnetic film is formed of either one of FeTaN and an FeTaN alloy.

6. A medium as claimed in claim 5, further comprising a junction layer having a thickness of less than 100 nm inclusive and intervening between said soft magnetic film and said perpendicular magnetization film.

7. A medium as claimed in claim 6, wherein said junction layer is formed of one of $Co_{1-x}Cr_x$ ($0.25 \leq x \leq 0.60$), Ti and CrTi.

8. A medium as claimed in claim 1, wherein said soft magnetic film comprises a granular thin film.

9. A medium as claimed in claim 8, wherein either one of $SiO_2$ and C is used as a parent material for said granular thin film while one of Co, CoPt and CoCrPt is used as granular material to be dispersed in said parent material, wherein said patent material and said granular material are arranged in a matrix consisting of columns and rows, respectively, and wherein said granular thin film is formed by either one of said columns and said rows.

10. A medium as claimed in claim 9, further comprising one of a Cr film, a V film and a Cu film intervening between said granular thin film and said substrate and having a thickness of less than 500 nm inclusive.

11. A medium as claimed in claim 8, further comprising a junction layer having a thickness of less than 100 nm inclusive and intervening between said soft magnetic film and said perpendicular magnetization film.

12. A medium as claimed in claim 11, wherein said junction layer is formed of one of $Co_{1-x}Cr_x$ ($0.25 \leq x \leq 0.60$), Ti and CrTi.

13. A medium as claimed in claim 8, further comprising one of a Cr film, a V film and a Cu film intervening between said granular thin film and said substrate and having a thickness of less than 500 nm inclusive.

14. A medium as claimed in claim 1, further comprising a junction layer having a thickness of less than 100 nm inclusive and intervening between said soft magnetic film and said perpendicular magnetization film.

15. A medium as claimed in claim 14 wherein said junction layer is formed of one of $Co_{1-x}Cr_x$ ($0.25 \leq x \leq 0.60$), Ti and CrTi.

16. A medium as claimed in claim 15, further comprising one of a Cr film, a V film and a Cu film intervening between said soft magnetic film and said substrate and having a thickness of less than 500 nm inclusive.

17. A medium as claimed in claim 14, further comprising one of a Cr film, a V film and a Cu film intervening between said soft magnetic film said substrate and having a thickness of less than 500 nm inclusive.

* * * * *